Figure 1:
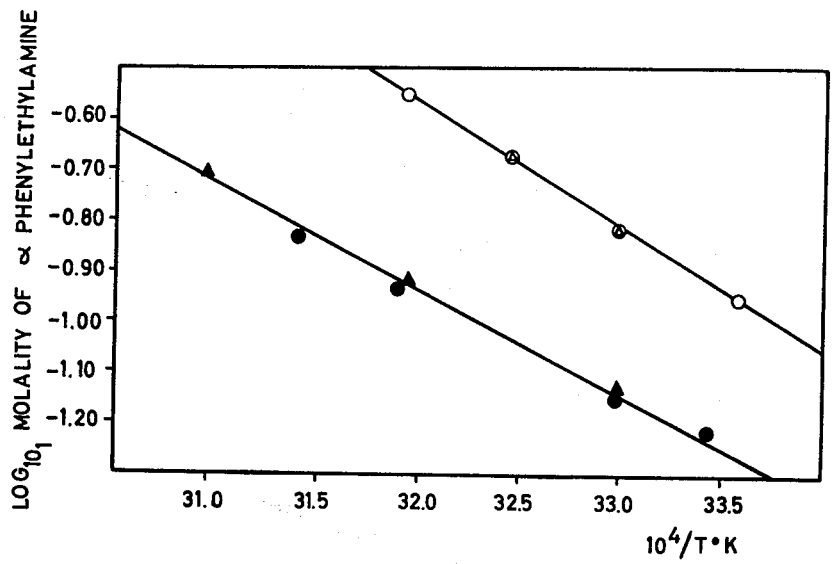

DISSOCIATION OF THE COMPLEX $[Ni(SCN)_2 (\alpha\text{-PHENYLETHYLAMINE})_4]$
IN O-XYLENE AND n- HEPTANE

○ INCREASING TEMPERATURES IN O-XYLENE
△ DECREASING TEMPERATURES " "  "

● INCREASING TEMPERATURES IN n - HEPTANE
▲ DECREASING TEMPERATURES " "  "

THE CONCENTRATION OF AMINE IS EXPRESSED IN MOLALITY (MOLES OF AMINE/KG OF SOLVENT)

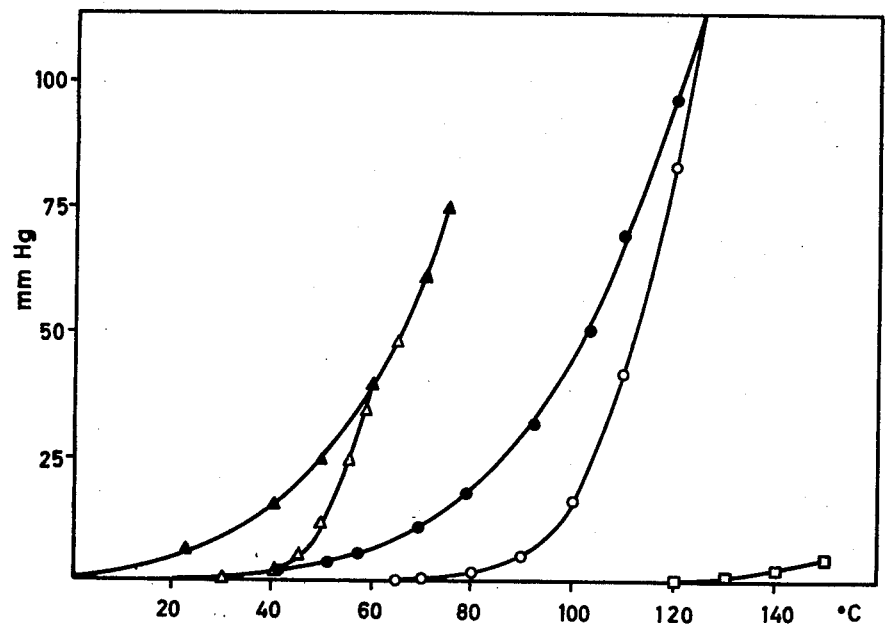

THERMAL DISSOCIATION OF THE COMPLEX $[Ni(SCN)_2(\alpha\text{ PHENYLETHYLAMINE})_4]$
AND ITS O-XYLENE CLATHRATE

- ● VAPOUR PRESSURE OF PHENYLETHYLAMINE
- ▲ VAPOUR PRESSURE OF O-XYLENE
- ○ DISSOCIATION PRESSURE OF THE COMPLEX
  $[Ni(SCN)_2(\alpha\text{ PHENYLETHYLAMINE})_4]$
- △ DISSOCIATION PRESSURE OF THE O-XYLENE CLATHRATE
- □ DISSOCIATION PRESSURE OF THE COMPLEX
  $[Ni(SCN)_2(\alpha\text{ PHENYLETHYLAMINE})_2]$

FIG. 2

THERMAL DISSOCIATION OF THE COMPLEX $[Ni(SCN)_2$ (4-METHYLPYRIDINE$)_4]$ AND ITS p-XYLENE CLATHRATE

● VAPOUR PRESSURE OF 4-METHYLPYRIDINE

▲ VAPOUR PRESSURE OF p-XYLENE

○ DISSOCIATION PRESSURE OF THE COMPLEX $[Ni(SCN)_2$ (4-METHYLPYRIDINE$)_4]$

△ DISSOCIATION PRESSURE OF THE p-XYLENE CLATHRATE

----- VAPOUR PRESSURE OF p-XYLENE LIBERATED FROM THE CLATHRATE

United States Patent Office

3,177,266
Patented Apr. 6, 1965

3,177,266
SEPARATION OF AROMATIC COMPOUNDS BY FORMING CLATHRATES WITH WERNER COMPLEXES OF 2-ARYLALKYLAMINES
Pierre Marie Joseph Ghislain de Radzitzky d'Ostrowick and Jacques Daniel Victor Hanotier, Brussels, Belgium, assignors to Labofina, Brussels, Belgium
Filed May 22, 1963, Ser. No. 282,429
Claims priority, application Great Britain, May 31, 1962, 21,098/62; June 4, 1962, 21,532/62
4 Claims. (Cl. 260—674)

This invention relates to a process of clathration of organic compounds by means of Werner complexes.

This application is a continuation-in-part of application Serial No. 143,030 filed October 3, 1961, now abandoned, which is a continuation-in-part of application Serial No. 855,957, filed November 30, 1959, now abandoned.

The formation of interstitial compounds, of which clathration is a particular case, has been known in a general manner for some years. In these compounds, molecules of one constituent are included in the spaces existing between the molecules of the crystal lattice of the other constituent. In clathrates as described by Powell (J. Chem. Soc. London 61–73, 1948), the clathrated molecules are lodged in the spaces in the lattice of the host compound and no chemical interaction between the two constituents is claimed to exist. Today, however, the term clathrate is not confined to compounds in which the two constituents are associated by a purely mechanical relationship. In particular, in the clathrates formed by Werner complexes it is possible to have a number of forms of association between the two constituents of the clathrate, although the interaction is predominantly mechanical and physico-chemical. Thus the present invention is not to be considered as limited to clathrates which exhibit a purely mechanical inclusion of one constituent in the lattice of the other.

Clathration of aromatic hydrocarbons in accordance with this wider definition has been described in United Kingdom Patent No. 811,137, and in several United States Patents Nos. 2,849,513; 2,849,511; 2,798,891; 2,798,103; 2,798,102; and 2,774,802. The process of clathration described in these patents is capable of bringing about the resolution of mixtures of compounds. It is especially applicable to the selective isolation of para-disubstituted aromatic compounds. Thus a mixture of the three cymenes can be highly enriched in p-cymene in only one step. The clathration described in these patents is carried out by the use of a Werner complex of the general formula $MA_2X_4$, in which M is a metal of atomic number above 12, A is a polyatomic anion and X is a heterocyclic nitrogen base, the nitrogen being part of the aromatic nucleus such as 4-methylpyridine and 4-ethylpyridine. Using said Werner complexes, the clathration can be effected by three different methods, (1) directly by simple contact between the aromatic compound to be clathrated and the solid Werner complex, (2) by precipitation from a solution containing the complex and the aromatic compound to be clathrated, or (3) by the preparation of the Werner complex from its chemical components in the presence of the aromatic compound to be clathrated. The clathrating capacity of a Werner complex including a heterocyclic nitrogen base is between 5 and 70% of its own weight of a clathratable mixture.

To recover the clathrated component, the decomposition of the clathrate can be carried out in many ways, for example by heating, by acidification or by dissolving the clathrate in an appropriate solvent. If the decomposition is brought about by heating, however, it is difficult to avoid decomposition of the Werner complex. In order to keep the extent of such decomposition low it is convenient to carry out the heating in an atmosphere of the nitrogen base, but this in turn adversely affects the equilibrium of the dissociation of the Werner complex in such a way as to repress the dissociation of the clathrate.

The object of the present invention is to provide a novel process employing novel clathration agents.

Other objects and advantages of the present invention will become apparent upon further study of the specification and the appended claims.

Figure 3:
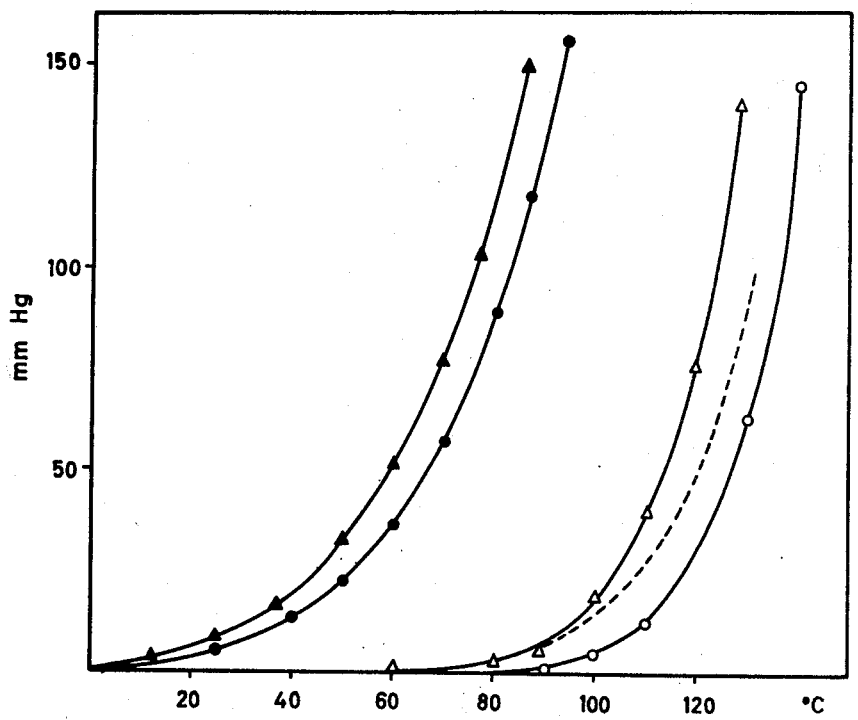

With respect to the attached drawings, FIGURES 1, 2 and 3 depict the relationship of temperature versus the degree of dissociation of various clathration agents.

According to the present invention, the process of clathration comprises contacting a Werner complex of general formula $NiA_2X_4$ with one or more compounds which are clathratable by said Werner complex, said Werner complex having been formed from a Werner complex of general formula $NiA_2X_2$ in the presence of said clathratable compound or compounds, A being a polyatomic monovalent anion including a carbon atom doubly or triply bonded to a nitrogen atom, X being a primary phenyl-substituted alkylamine, the phenyl group being either substituted or unsubstituted, the alkyl chain thereof containing from one to thirty carbon atoms.

According to another feature of the invention a process of forming a clathrate comprises contacting with a Werner complex of general formula $Ni(SCN)_2X_4$ one or more compounds clathratable by said Werner complex, said Werner complex having been formed from a Werner complex of general formula $Ni(SCN)_2X_2$ in the presence of the said clathratable compound or compounds, X being a primary, phenyl-substituted alkylamine, the phenyl group being itself either substituted or unsubstituted and the alkyl chain containing 1 to 30 carbon atoms. In the Werner complex of general formula $Ni(SCN)_2X_4$ at least one of the four molecules of combined primary, phenyl-substituted alkylamine may be different from the others. It is also to be noted that no choice is made regarding the form of the thiocyanate anion. The formula SCN must be taken as a whole and not restricted specifically to the normal or iso forms.

Conveniently, a process of forming a clathrate consisting of a Werner complex of general formula $Ni(SCN)_2X_4$ and one or more compounds clathratable by Werner complex comprises contacting a mixture of compounds including said clathratable compound or compounds with a Werner complex of general formula $Ni(SCN)_2X_2$, and adding to said contacted mixture the primary, phenyl-substituted alkylamine.

Alternatively, such a process comprises adding a Werner complex of general formula $Ni(SCN)_2X_2$ to a mixture including said clathratable compound or compounds and said primary phenyl-substituted alkylamine.

In addition, a process is provided of forming a clathrate consisting of a Werner complex of general formula $Ni(SCN)_2X_4$ and one or more compounds clathratable by said Werner complex, in which the Werner complex of general formula $Ni(SCN)_2X_4$ is prepared by heating a Werner complex of general formula $Ni(SCN)_2X_4$ which is incapable per se of clathrating, with one or more clathratable compounds to a temperature sufficient to bring about complete dissociation of the said Werner complex into $Ni(SCN)_2X_2$ and 2X, and then cooling to effect recombination of the dissociated components to form a clathrate consisting of $Ni(SCN)_2X_4$ and said clathratable compound or compounds.

The invention further comprehends a process of resolving a mixture of aromatic organic compounds which mixture contains at least one compound clathratable by a Werner complex of general formula $Ni(SCN)_2X_4$, said process comprising forming a clathrate with the clathratable compound or compounds in said mixture by any of the methods hereinbefore described, and dissociating said clathrate in order to obtain the clathrated aromatic organic compound or compounds.

Conveniently the dissociation of the clathrate is effected by heating. Alternatively this dissociation may be effected by treatment of the clathrate with a mineral acid which does not react with the clathrated compound or compounds, or by treatment with heated water vapor, or by elution with an inert solvent.

This invention further comprehends a composition of matter, being a clathrate, consisting of a Werner complex of general formula $Ni(SCN)_2X_4$, X being a primary, phenyl-substituted alkylamine, the phenyl group being itself further substituted or not further substituted, and the alkyl chain conaining from 1 to 30 carbon atoms, and one or more aromatic compounds. The invention also comprehends such a composition of matter whenever produced by the process described herein.

The amine radical of the said primary phenyl-substituted alkylamine is advantageously located on the terminal carbon atom of the alkyl chain and in α-position with respect to the phenyl group.

A preferred amine according to the invention is α-phenylethylamine. The further substituent, if any, which is attached to the phenyl group may be hydrocarbon or not hydrocarbon provided that it does not interfere with the function of the amine radical.

In general, the alkyl chain, which may be straight or branched, preferably contains from 1 to 10 carbon atoms (and even more preferably from about 1 to 8 carbon atoms); with more than 10 carbon atoms the clathration becomes increasingly difficult due to the increasing solubility of the corresponding 4-base complexes in aromatic compounds. For steric reasons, when there is a branching on the alkyl chain, the tertiary carbon atom is preferably separated from the carbon atom carrying both the amino and phenyl group by at least one methylene group.

The amines preferably conform to the following formula:

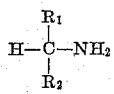

wherein $R_1$ is either hydrogen or a primary alkyl group of preferably 1–9 carbon atoms.

$R_2$ is the phenyl group, being unsubstituted, mono-substituted, or poly-substituted.

If $R_1$ is hydrogen, the phenyl group is preferably substituted. In general, when the phenyl group is itself substituted, the moieties attached thereto affect to some degree the overall properties of the complex. Consequently, as a convenient breakdown, the complexes are described as unsubstituted, mono-substituted and poly-substituted, referring to the degree of substitution of the phenyl group of the amine.

*Unsubstituted.*—In this case $R_1$ is never hydrogen, and is preferably of 1–9 carbon atoms.

*Monosubstituted.*—In this case $R_1$ is preferably of 1–9 carbon atoms and $R_2$ is a phenyl group of the formula $YC_6H_4$—wherein Y is attached to a nuclear carbon and is selected from the group consisting of an alkyl group of 1–9 carbon atoms, and a polar group chemically substantially neutral to $NH_2$.

It is, furthermore, preferred that Y and $R_1$ do not each simultaneously contain more than 3 carbon atoms.

*Polysubstituted.*—Under this classification, the phenyl group is substituted by alkyl groups on the one hand and by halogen groups on the other hand, as follows:

*Alkyl-substituted.*—In this type of α-arylalkylamine, $R_1$ is either hydrogen or a primary alkyl group, and $R_2$ is a phenyl group substituted by 2 to 3 alkyl groups at the 3,4,5 positions.

Because of steric effect and solubility considerations, it is preferred that there be about 1 to about 6 carbon atoms in the $R_1$ alkyl group, even more preferably 1 to 3 carbon atoms. Furthermore, it is preferred that the alkyl substituents of the phenyl group be of less than 3 carbon atoms, it being particularly advantageous for the substituents to be identical, the most preferred polyalkylated phenyl group being 3,4-dimethylphenyl.

The clathrating agents following this invention permit resolution of mixtures which are difficult to resolve by conventional methods, particularly mixtures of polar substituted aromatic compounds. As shown by the specific examples given hereinafter, those complexes exhibit high selectivities and extremely high capacities as clathrating agents towards aromatic molecules carrying at least one polar group such as a halogen, a nitro, a cyano, or even a hydroxyl group. They form therefore a convenient means for extracting or resolving into their isomers molecules such as:

benzotrifluoride
nitrobenzene
nitrotoluenes
dichlorobenzenes
trichlorobenzenes
cresols
benzonitrile This list is by no means limitative and many other aromatic molecules are also clathrated.

When compared to complexes of the same general formula but using other types of arylalklyamines, the complexes used in this invention exhibit marked and highly unexpected superiority in such clathration processes.

*Halogen-substituted.*—In this type of α-arylalkylamine, $R_1$ is again either hydrogen or a primary alkyl group, and $R_2$ is a 3,4-dihalophenyl group. The halogen substituents can be different or preferably the same, being for example chlorine, bromine, iodine, or fluorine. The preferred group is 3,4-dichlorophenyl.

Because of solubility and steric effects, it is preferred that $R_1$ contain about 1–9, more preferably 1–6 carbon atoms.

Complexes based on these amines are unexpectedly superior when used in clathration processes. They also have the advantage of being less soluble and generally less dissociated in aromatic compounds than the similar complexes not having two halogen substituents.

The following list, which is intended for purposes of illustration only, gives some examples of amines within the scope of the invention.

Para-methylbenzylamine
α-Phenylethylamine
α-Phenylpropylamine
α-Phenylbutylamine
α-Phenylamylamine
α-Phenylisoamylamine
α-Phenylhexylamine
α-Phenylisohexylamine
α-Phenylheptylamine
α-Phenyloctylamine
α-Phenylnonylamine
α-Phenyldecylamine
α-Phenyloctadecylamine
α-(Ortho-tolyl)ethylamine
α-(Meta-tolyl)ethylamine
α-(para-tolyl)ethylamine
α-(Para-ethylphenyl)ethylamine
α-(Para-cumyl)ethylamine
α-(Para-ter-butylphenyl)ethylamine
α-(Para-nonylphenyl)ethylamine
α-(Para-tolyl)butylamine
α-(Para-tolyl)hepthylamine
Para-bromobenzylamine
Para-dimethylaminobenzylamine
α-(Para-fluorophenyl)ethylamine
α-(Ortho-chlorophenyl)ethylamine
α-(Para-chlorophenyl)ethylamine α-(Meta-bromophenyl)ethylamine
α-(Para-bromophenyl)ethylamine
α-(Para-iodophenyl)ethylamine
α-(Para-chlorophenyl)propylamine
α-(Meta-bromophenyl)propylamine
α-(Para-bromophenyl)propylamine
α-(Para-bromophenyl)butylamine
α-(Para-chlorophenyl)amylamine
α-(Para-bromophenyl)amylamine
α-(Para-fluorophenyl)isoamylamine
α-(Para-chlorophenyl)isoamylamine
α-(Para-bromophenyl)isoamylamine
α-(Para-chlorophenyl)hexylamine
α-(Para-bromophenyl)hexylamine
α-(Meta-bromophenyl)heptylamine
α-(Para-bromophenyl)heptylamine
α-(Para-bromophenyl)nonylamine
α-(Para-methoxyphenyl)ethylamine
α-(Para-butoxyphenyl)ethylamine
α-(Meta-nitrophenyl)ethylamine
α-(3,4-dimethylphenyl)ethylamine
α-(3,4-dimethylphenyl)butylamine
α-(3,4-dimethylphenyl)heptylamine
α-(3,5-dimethylphenyl)ethylamine
α-(3,4,5-trimethylphenyl)ethylamine
α-(3,4,5-trimethylphenyl)propylamine
α-(3,4,5-triethylphenyl)ethylamine
α-(3,4-dichlorophenyl)ethylamine
α(3,4-dichlorophenyl)butylamine
α-(3,4-dichlorophenyl)heptylamine
α-(3,4-dibromophenyl)ethylamine This list is given by way of example, and numerous other amines have been employed which have either different alkyl chains or different substituents in the aromatic nucleus and are capable of forming the 4-base complex and clathrates according to the process described herein. Different amines produce complexes which clathrate to different extents and these different complexes differ in the particular compounds which they clathrate selectively. The choice of amine is thus dictated by the particular conditions of the clathration to be effected.

All of the amines used in the compounds according to the present invention have a weak ammoniacal odor and thus differ markedly in this respect from the heterocyclic bases used in the known processes, which have a strong persistent nauseous odor. They also have a low vapor pressure thus reducing risk of fire or of inhalation of the vapor. For example γ-picoline and 4-ethylpyridine are two of the heterocyclic bases most used in the known processes of clathration, and the only ones which form complexes which compare with the complexes according to the present invention as far as clathrating capacity is concerned. The boiling points of γ-picoline and 4-ethylpyridine are 134° C. and 166° C., respectively, whereas even unsubstituted benzylamine, which may be considered as the lower limit of the class of amines used in the present invention, has a boiling point of about 184° C. In any event the amines in the compounds of this invention are less hazardous and less noxious than previously used heterocyclic bases, and from this standpoint, interalia, the compounds of this invention are markedly improved over the prior art.

In addition, the amines used in the present invention are easy to obtain by Friedel-Crafts synthesis from benzene or a substituted benzene and an acid chloride and subsequent ammoniacal reduction of the intermediate ketone.

The complexes formed with these amines are of two forms: $Ni(SCN)_2X_2$ and $Ni(SCN)_2X_4$. The first of these forms $Ni(SCN)_2X_2$ does not form any clathrate with aromatic organic compounds. It is, however, possible to obtain clathrates using the second form of complex $Ni(SCN)_2X_4$, but in order to bring about clathration using this complex it is essential to start from the complex $Ni(SCN)_2X_2$ and to convert it into $Ni(SCN)_2X_4$ in the presence of the compound to be clathrated. It appears that this transformation leads to a specific arrangement of the crystal lattice which is necessary to enable the host structure to include the second constituent of the clathrate. A point in favor of this theory is that if one succeeds in removing a clathrated compound from a clathrate without destroying the crystal lattice of the host compound it is possible to reclathrate this formerly clathrated compound by simple contact with the complex. A 4-base complex prepared in the absence of clathratable compounds is however incapable of effecting clathration by simple contact.

Experiments show that it is possible to bring about clathration by using composite complexes of the type $Ni(SCN)_2X_{(4-n)}X'_n$ in which $X'$ is phenyl-substituted primary alkylamine different from $X$ but conforming to the foregoing general definition. For instance, clathrates using such complexes are easily prepared from the complex $Ni(SCN)_2X_2$ to which 2 molar equivalents of $X'$ are added in the presence of the compound to be clathrated. It is also possible to bring about clathrations with complexes containing variable proportions of 2 or more amines conforming to the general definition. The use of such complexes is the scope of the present invention.

The solubility of the complex in hydrocarbons depends on the number of carbon atoms in the alkyl chain and on the nature of the substituents in the aromatic nucleus. In general, the 2-base complex is less soluble than the corresponding 4-base complex. Preparation of these complexes has been described in United Kingdom patent applications Nos. 38,654/58 and 33,987/59. The composition of the clathrates is related to the structure of the complex and to the composition of the mixture subjected to clathration. In this respect there is a great difference between the process according to the present invention and that described in United Kingdom Patent No. 811,137. For instance, clathration of a mixture of the three cymenes using a complex described in Patent No. 811,137, e.g. [$Ni(SCN)_2$ (4-methyl pyridine)$_4$], results in enrichment of p-cymene in the clathrate. However, if the same mixture is treated with the complex [$Ni(SCN)_2$ (α-phenylethylamine)$_4$] according to the present invention, clathration results unexpectedly in a strong enrichment of o-cymene. This phenomenon will appear clearly in the ensuing examples.

The nature of the substituent in the aromatic nucleus, and the length of the alkyl chain, also have an influence on what may be called the selectivity of the Werner complex in resolving mixtures. As in the case of Werner complexes described by Schaeffer in United Kingdom Patent No. 811,137, although broad tendencies may appear sometimes to indicate rules of selectivity, it is impossible, in the present state of knowledge of the function of these compounds in the clathrating process, to predict specific examples of this selectivity.

It is essential, when performing clathration using Werner complex according to the present invention, that the complex shall pass from one form to another in the presence of the mixture to be clathrated. It is necessary that the complex shall pass from the form $Ni(SCN)_2X_2$ to the form $Ni(SCN)_2X_4$ in the presence of the mixture to be clathrated, and this conversion can be brought about in a number of ways.

For a more thorough comprehension of the process which will be described hereinafter, it is useful to consider the conditions which affect the equilibrium between these two forms of the complex. The conversion of one form to the other is represented by the reaction $$Ni(SCN)_2X_2 + 2X = Ni(SCN)_2X_4$$

where $X$ is an amine as previously defined. If this reaction between a solid and a liquid to produce another solid is carried out in a liquid medium in which the amine is dissolved, it follows that the state of equilibrium will depend on the nature of the liquid medium in which the reaction is carried out, and on the concentration of the amine dissolved in this medium. Further, raising the temperature will displace the equilibrium toward the left, and, conversely, lowering the temperature will displace the equilibrium towards the right. For a given liquid phase, and operating at a given temperature, the equilibrium point of this reaction is determined solely by the concentration of the dissolved amine. In effect, the equilibrium constant of the reaction, K, is given by the expression $K=1/[X]^2$. It follows that the presence of excess amine will repress the dissociation of the 4-base complex. At ordinary temperatures, and if the liquid medium is relatively inert, as is the case when a clathration is being performed, the equilibrium is strongly in favor of conversion to the 4-base complex even if only the stoichiometric quantity of amine is used.

Under the same conditions, but at 120° C., any of the 4-base complexes of the present invention will be completely disassociated, even in concentrated solution, but at this temperature dissociation of the 2-base complex is negligible. It is therefore simple to determine experimentally, for a given liquid medium, the relation between the temperature and the degree of dissociation of the 4-base complex, since this degree of dissociation can be conveniently measured by the concentration of free amine coexisting with the two forms of the complex.

FIGURE 1 shows the relation existing between the degree of dissociation of the complex $[(Ni(SCN)_2\ (\alpha\text{-phenylethylamine})_4]$ and the temperature, measured by the concentration of free $\alpha$-phenylethylamine. The measurements were carried out in two solvents, heptane and o-xylene. The complete correspondence between the results obtained from observations made while raising the temperature and those made while lowering the temperature indicated that the reaction was perfectly reversible and that equilibrium was attained in each case. It can be seen also that the nature of the liquid medium, in this case heptane or o-xylene, has an effect on the degree of dissociation.

Since the degree of dissociation can be expressed as a simple linear function of the temperature it is therefore a simple matter to determine by calculation the experimental conditions for obtaining any desired degree of dissociation. For example, in order to obtain complete dissociation of 250 g. of the complex $[Ni(SCN)_2\ (\alpha\text{-phenylethylamine})_4]$ suspended in 1 kg. of o-xylene it is sufficient to heat the suspension at a temperature of 58° C. At this temperature the whole of the 4-base complex is converted into the 2-base complex and the effect of stronger heating is merely to accelerate the reaction. Similarly, if it is desired to work at a lower temperature, e.g. 45° C., then in order to bring about complete dissociation of 250 g. of the complex it is necessary to place the 250 g. of the complex in suspension in 2 kg. of o-xylene.

From the preceding it follows that in order to form the 4-base complex from the corresponding 2-base complex it is necessary in order to achieve completion of the reaction to operate in the presence of excess amine, and the extent of this excess will depend both on the temperature at which the reaction is carried out and on the nature and quantity of the solvent employed. For example, at 25° C. the complex $[Ni(SCN)_2(\alpha\text{-phenylethylamine})_4]$ is formed quantitatively from the stoichiometric quantities of amine and 2-base complex, using o-xylene as the solvent, provided that the amine be present in solution in the o-xylene a concentration of at least 0.112 mole/kg. At −10° C. the necessary concentration of amine in o-xylene is 0.009 mole/kg. At 25° C., using heptane as the solvent, the necessary concentration of amine is 0.055 mole/kg. It is evident from these examples that the extent of dissociation of the complex is markedly less pronounced in aliphatic solvents than in aromatics. It must be noted that the foregoing reasoning only applies when the 4-base complex is present in solid form throughout the dissociation reaction, or at the very least the concentration of dissolved complex must be negligible in comparison with the concentration of free amine; this condition is necessarily realized in cases where clathration is possible. It follows also that, once the relationship between the temperature at which the dissociation is carried out and the extent of this dissociation taking place in a specific clathratable mixture is established it is a simple matter to establish by calculation the optimum conditions under which to perform the clathration.

To carry out clathration according to the present invention it is possible to employ any of a number of different methods. Firstly, one can contact the mixture to be clathrated with the 2-base complex and add to this suspension the stoichiometric quantity of amine, together with that additional amount of amine which corresponds to the amount of amine present by virtue of the dissociation of the 4-base complex in this particular medium. The clathrate is formed rapidly and can be separated by filtration or centrifugation. Alternatively, it is possible to mix the amine with the mixture to be clathrated, since these are usually entirely miscible, and to add to this homogeneous phase the 2-base complex in solid form. The clathrate is formed rapidly as in the preceding method.

A further means of carrying out the invention consists of contacting a mixture to be clathrated with a quantity of 4-base complex which is incapable per se of clathrating, heating this contacted mixture to a temperature sufficient to bring about complete dissociation of the 4-base complex into the 2-base complex and free amine, and then cooling the mixture so heated to permit recombination of the dissociated components to form a clathrate consisting of the 4-base complex and the clathratable compounds in the mixture. If in carrying out this method complete dissociation of the 4-base complex is not achieved, through insufficient heating, the 4-base complex not dissociated will not only remain inactive as a cathrating agent after cooling but will in most cases inhibit the formation of a clathrate by the remaining re-formed 4-base complex. This is evidence that the 4-base complex is normally incapable per se of clathrating, and that in order to obtain a form of the complex which will clathrate it is indispensable, in accordance with the present process, that the 2-base complex should be in the presence of the mixture to be clathrated before any conversion of the 2-base complex to the 4-base complex occurs.

Further, it is not necessary that the 2-base complex be introduced as such into the mixture to be clathrated, it being quite in accordance with the invention, that the 2-base complex be formed in situ from its chemical components. This will be demonstrated clearly in the examples.

The process of clathration according to the present invention can be applied to the purification of a mixture which contains at least one clathratable impurity, and also to the resolution of certain mixtures. In the latter case it is necessary to recover the organic compounds from the clathrate formed as a result of the process, and to separate them therefrom. In order to carry out this separation it is possible to dissociate the clathrate without destroying or changing the structure of the complex. This separation, however, can only be employed if the temperature of dissociation of the clathrate and of the complex are sufficiently widely separated. The clathrates obtained by the process of the present invention are particularly applicable to thermal means of separation, since the temperature gap between their temperatures of dissociation and the temperatures of dissociation of the corresponding complexes is appreciably larger than the corresponding gap encountered when carrying out clathration using Werner complexes which embody pyridinic bases. The temperatures of dissociation of the clathrates are also lower than those of the clathrates obtained according to the previously known procedures and this reduces the extent of the heating operation.

By way of example, FIGURE 2 shows the effect of heating a clathrate formed between [Ni(SCN)$_2$($\alpha$-phenylethylamine)$_4$] and o-xylene. o-Xylene commences to be evolved from the clathrate at about 30° C., and the vapor pressure of the o-xylene so liberated reaches the value of the vapor pressure of the pure hydrocarbon at a temperature of 60° C., at which temperature the dissociation of the clathrate can therefore be considered complete. At this temperature, however, the dissociation of the Werner complex is negligible. In fact, it can be seen from the graph that the vapor pressure of free $\alpha$-phenylethylamine, which gives an indication of the extent of dissociation of the Werner complex, does not become measurable until a temperature of 65° C. In the region of 100° C., however, it begins to increase rapidly and achieves the value of the vapor pressure of the pure amine at a temperature slightly below 130° C., at which temperature therefore the dissociation of the 4-base complex into the 2-base complex can be considered complete.

On the other hand, referring to the case of a clathrate formed between [Ni(SCN)$_2$(4-methylpyridine)$_4$] and p-xylene, FIGURE 3 shows the dissociation of the clathrate and of the Werner complex to be virtually simultaneous; at temperatures above 80° C. similar quantities of base and of hydrocarbon are liberated, and even at 130° C. neither of these dissociation reactions is complete.

Evidently, therefore, in carrying out clathration according to the process of the present invention, it will be possible to carry out a thermal process of separation of clathrated compounds and Werner complex at a much lower temperature than has been possible in the known process; furthermore, the product obtained as a result of this process of separation will be contaminated with far less of the Werner complex base than has previously been the case. This will be demonstrated in the examples which follow. The other complexes and clathrates obtained according to the present invention show a similar behavior in their applicability to thermal separation as that which formed the basis of the comparison between FIGURES 2 and 3.

It is not absolutely necessary to carry out the separation of clathrated compounds by a thermal process; indeed, it is possible to remove quantitatively any clathrated compound or compounds from a clathrate by elution with an inert solvent (for example, a saturated hydrocarbon) in which the Werner complex is substantially insoluble, operating at a temperature equal to or even lower than the temperature of formation of the clathrate. Here again the clathrates obtained by the process of the present invention differ markedly from those obtained from pyridinic base complexes of the known processes in which it is always necessary to carry out the elution of the clathrated compounds at a temperature appreciably higher than the temperature of formation of the clathrate.

Saturated hydrocarbons such as pentane, heptane or cyclohexane are perfectly suitable for carrying out such an elution, the Werner complexes obtained according to the present invention being insoluble, and furthermore undergoing only very slight dissociation to the corresponding 2-base complexes, in saturated hydrocarbons. From the matter hereinbefore set forth, it is evident that elution of clathrated substances by means of an inert saturated hydrocarbon can be carried out without any dissociation of the 4-base complex provided that a quantity of amine corresponding at least to the equilibrium concentration of free amine is added beforehand to the elution solvent. At room temperature this quantity of amine is generally very small compared with the quantity of elution solvent, or even with the quantity of clathrated substances, due to the much higher and faster dissociation of clathrates to the corresponding 4-base complexes compared to the dissociation of 4-base complexes to the corresponding 2-base complexes. The different aspects of this elution method will appear more clearly in examples.

The decomposition of the clathrates can also be carried out chemically. If an acid is used as the chemical means the base component of the Werner complex goes into solution as a salt of this acid and is usually therefore easily separated from the clathrated compound.

On the other hand, when carrying out thermal decomposition of the clathrate the clathrated compound will inevitably be contaminated with the base forming the Werner complex, although this amount of contamination will be less using the process of the present invention than when using the previously known processes, as is shown by the vapor pressure curves in FIGURES 2 and 3, which compare clathration of isomeric xylenes by the previously known process incorporating Werner complex in which the base is 4-methyl pyridine with clathration by the process of the present invention in which the base of the Werner complex is $\alpha$-phenylethylamine. It is evidence that it is far easier to separate the clathrated xylenes (B.P. 138–144.4° C.) from $\alpha$-phenylethylamine (B.P. 187.4° C.) than from 4-methylpyridine (B.P. 143.1° C.).

Similarly, the number of amines which are available is much greater according to the process of the present invention that has been the case in the prior art; furthermore, there is far greater scope for choosing an amine of boiling point well separated from that of the clathrated compound, this permitting good separation of the amine from the clathrated compound.

The resolution of mixtures containing at least one aromatic compound is another application of the present invention. The mixture to be resolved obviously must contain at least one clathratable compound. The process of clathration applied in such a case is identical to the process as previously described herein and will be further demonstrated in the examples which follow. The compound clathrated selectively is then separated from the clathrate by chemical or physical means. A large number of mixtures have been resolved in this way and the efficacy with which the separation is achieved will also appear in the examples.

In general, it is necessary to avoid the presence in mixtures to be clathrated of substances which are substituted by radicals which can interfere with the action of, or destroy, the clathrates. Examples of such radicals are —SO$_3$H, —COOH, alkyl-NH$_2$ and

since these either react with the amine component of the Werner complex, or displace it from the complex.

In order that the present invention may be more clearly understood, the following preferred specific embodiments of clathration according to the invention are given, by way of examples, and are not intended to be limitative of the specification and appended claims.

(A) EXAMPLES BASED ON UNSUBSTITUTED AND MONOSUBSTITUTED PHENYLALKYLAMINE COMPLEXES

*Example 1*

This example illustrates the preparation of clathrates by the conversion of the 2-base complex into the corresponding 4-base complex in the presence of a mixture to be clathrated.

The 2-base complex [Ni(SCN)$_2$($\alpha$-phenylethylamine)$_2$] is first prepared from its chemical components. a 30% aqueous solution of Ni(SCN)$_2$ is obtained by adding, to a solution of $NiCl_2 \cdot 6H_2O$, 2 molar equivalents of KSCN. One volume of chloroform and two volumes of heptane are added to the solution of $Ni(SCN)_2$ thus obtained, and to this 2-phase mixture there is added, gradually and with agitation, two molar equivalents of α-phenylethylamine dissolved in its own volume of chloroform. The precipitate formed is filtered off, washed once in suspension in a 2/1 heptane-water mixture, and washed a second time in chloroform. It is then dried under vacuum at 100° C. for several hours. The complex obtained is in the form of a pale green powder. No clathrate is formed by contacting an aromatic compound with this complex.

The use of chloroform in the above process is explained by its property of dissolving the 4-base complex but not the 2-base complex. Since, in addition, chloroform decomposes most of the 4-base complexes of the present invention into the corresponding 2-base complexes, the latter are therefore obtained in the process of this example, in a state of high purity and in practically quantitative yield.

To carry out clathration the 2-base complex is prepared as described and suspended in about 10 times its own weight of a mixture of o- and m-xylene and to this suspension there is added two molar equivalents of α-phenylethylamine, plus a 14% excess of the total amine in order to bring about complete conversion of the 2-base complex to the 4-base complex. Very shortly after the addition of the amine there is a sudden transformation of the 2-base complex into the 4-base complex which is marked by the appearance of a flocculent blue precipitate. After agitating the reaction mixture for about an hour the precipitate is filtered, washed in the cold by suspension in heptane, dried for 2 hours under vacuum at room temperature, and decomposed by treatment with 6N HCl. The organic phase which separates from the acid phase is extracted with cyclohexane and analyzed by infra-red spectrophotometry. The results obtained are set out in Table I.

TABLE I

[Composition by weight of the initial xylene mixture 0-, 44; m-, 56]

| Clathration according to— | Composition (in weight percent) of clathrated xylene mixture | | Percentage by weight of xylenes included in the clathrate |
| --- | --- | --- | --- |
| | Ortho | Meta | |
| Example 1 | 73 | 27 | 18.9 |
| Example 2 | 72 | 28 | 19.1 |
| Example 3 | 73 | 27 | 18.1 |

*Example 2*

This example demonstrates how the clathration illustrated in the previous example can be carried out by forming the 2-base complex in situ from the 4-base complex, by heating the 4-base complex to above its temperature of dissociation, in the presence of the compounds to be clathrated, and then cooling the completely dissociated 4-base complex to reform an undissociated 4-base complex which is capable of clathrating.

A 30% solution of $Ni(SCN)_2$ is prepared as in the previous example and heptane is added to this solution. To the 2-phase mixture obtained is added, gradually and with agitation, 4 molar equivalents of α-phenylethylamine and an additional 12% excess of the amine in order to ensure that only the 4-base complex is formed. The use of heptane in this preparation is based on the fact that it has been established experimentally the presence of a liquid hydrocarbon results in a high degree of purity of the 4-base complex so obtained. The precipitate formed is filtered and then washed in the same volumes of heptane and water as were used in the previous example, and finally dried under vacuum, at room temperature, for several hours. The complex is obtained in the form of a blue powder. The complex so obtained is not capable at ordinary temperatures of forming a clathrate upon simple contact with a clathratable compound.

The complex $[Ni(SCN)_2(\alpha\text{-phenylethylamine})_4]$ so prepared is suspended in about six times its weight of a mixture of o- and m-xylene as in the previous example. An excess of amine of 14% with respect to the amount of amine present in the complex is added to this mixture in order to ensure the formation of the 4-base complex only. The suspension is then heated, with stirring, to a temperature of 125° C. During the course of this heating the 4-base complex is converted into the corresponding 2-base complex, this conversion being made apparent by a change in color of the suspension from blue to green. After maintaining the reaction mixture at a temperature of 125° C. for 30 minutes, the heating is discontinued, and the reaction mixture is cooled in running water. During the cooling the 2-base complex recombines with the amine to form the 4-base complex, this recombination occurring at a temperature of about 40° C. and being accompanied by rapid color change of the suspension from green to blue. When room temperature is attained, the precipitate is treated as in the previous example. The results obtained are set out in Table I.

These results show that a clathrate prepared in accordance with the procedure of Example 2 corresponds very closely in its composition to a clathrate prepared as in Example 1. Formation of a clathrate by the procedure of Example 2, however, does not occur unless the reaction conditions are such that the 4-base complex is at some stage of the heating completely dissociated. If this dissociation is incomplete, either because the temperature to which the mixture is heated is too low, or because the reaction is not continued for a sufficiently long period, there will be obtained upon cooling mostly a 4-base complex which is not in the form of a clathrate.

*Example 3*

To a 15% solution of $Ni(SCN)_2$ prepared from $NiCl_2 \cdot 6H_2O$ and two molar equivalents of KSCN are added, gradually and with stirring, four molar equivalents of α-phenylethylamine, plus a 12% excess of the amine to ensure formation of only the 4-base complex. The added amine is diluted in five times its own volume of the mixture of xylenes used in the previous example.

Immediately on commencement of the addition of amine a greenish precipitate starts to form, and is identifiable as the 2-base complex. This precipitation is completed at the end of the addition of the first two equivalents of the amine, and analysis shows that it is quite free of hydrocarbons and corresponds closely to the formula $[Ni(SCN)_2(\alpha\text{-phenylethylamine})_2]$. During the addition of the remainder of the amine the precipitate turns blue, and also thickens considerably. After stirring for about 20 minutes, the precipitate is filtered and treated as in the previous examples. Table I shows that it consists of a clathrate which is identical in composition with those obtained in Examples 1 and 2. If, however, in the present example the mixture of hydrocarbons is introduced after the formation of the 4-base complex, instead of with the amine, no clathration occurs.

This example also shows how the clathration illustrated in the previous examples can be carried out as a single stage process, by simply bringing into contact two phases; an aqueous phase containing $Ni(SCN)_2$, and an organic phase containing the amine and the compound or compounds to be clathrated; it shows also that the process involved in the formation of a clathrate in this particular process is precisely the same as the process by which the clathrate is formed in the two previous examples.

*Example 4*

An approximately equimolecular mixture of the three xylenes was clathrated by different types of Werner complex by the process according to the present invention.

The clathration process employed was the same as that described in Example 3, but it was in certain cases necessary, in order to obtain a clathrate, to operate at a temperature below room temperature (0° to 15° C.). Furthermore, the drying under vacuum was generally replaced by an additional washing in pentane, the clathrate was then dried in air. The results obtained are set out in Table II. These results show that the selectivity of the various Werner complexes in the clathration process varies both quantitatively and qualitatively with the nature of the amine which forms part of the complex, and that it is therefore possible to choose, for any particular clathration operation, that amine which results in the isolation of a desired component of the mixture.

position shown in Table III (similar in composition to fractions obtained in the catalytic reforming of naphtha) was clathrated, using as the clathrating agent a number of different Werner complexes according to the invention. The choice of the particular complex to effect this resolution was made purely arbitrarily, for purposes of illustration, and it is to be understood that other complexes of the same type are capable of obtaining the same, or better, results. However, it is apparent from the results that according to the particular amine which is used to form the Werner complex, one can obtain an enrichment of different components of the mixture to be

TABLE II

| X in Ni(SCN)$_2$X$_4$ | Weight percent of xylenes (o-, m-, p-) in— | | | | | | $C_p$* | Isomer(s) selectively clathrated |
|---|---|---|---|---|---|---|---|---|
| | Starting mixture | | | Clathrated mixture | | | | |
| α-Phenylethylamine | 37.1 | 31.1 | 31.8 | 61.9 | 19.5 | 18.6 | 18.2 | Ortho. |
| α-Phenylpropylamine | 37.1 | 31.1 | 31.8 | 12.3 | 25.8 | 61.9 | 17.8 | Para. |
| α-Phenylbutylamine | 37.1 | 31.1 | 31.8 | 22.9 | 7.5 | 69.6 | 11.3 | Para. |
| α-Phenylamylamine | 34.2 | 31.2 | 34.6 | 83.8 | 13.6 | 2.6 | 10.8 | Ortho. |
| α-Phenylisoamylamine | 33.6 | 31.9 | 34.5 | 72.2 | 19.4 | 8.4 | 17.5 | Ortho. |
| α-Phenylhexylamine | 33.9 | 31.7 | 34.4 | 4.6 | 70.9 | 24.5 | 8.9 | Meta. |
| α-Phenylisohexylamine | 34.8 | 30.9 | 34.3 | 12.9 | 75.9 | 11.2 | 9.8 | Meta. |
| α-Phenylheptylamine | 34.8 | 30.9 | 34.3 | 12.9 | 79.8 | 7.1 | 7.0 | Meta. |
| α-Phenyloctylamine | 34.5 | 32.1 | 33.4 | 25.7 | 61.8 | 12.5 | 9.9 | Meta. |
| α-Phenylnonylamine | 34.5 | 32.1 | 33.4 | 17.4 | 60.8 | 21.8 | 10.1 | Meta. |
| α-Phenyldecylamine | 34.8 | 30.9 | 34.3 | 86.6 | 10.8 | 2.6 | 5.4 | Ortho. |
| α-Phenyloctadecylamine | 34.1 | 31.9 | 34.0 | 22.1 | 71.2 | 6.7 | 1.6 | Meta. |
| α-(o-Tolyl)ethylamine | 50.1 | | 49.9 | 16.5 | | 63.5 | 4.1 | Para. |
| | | 48.4 | 51.6 | | 9.7 | 90.3 | 6.0 | Para. |
| α-(p-Tolyl)ethylamine | 34.2 | 30.1 | 35.7 | 60.0 | 11.2 | 28.8 | 13.8 | Ortho. |
| α-(p-Ethylphenyl)ethylamine | 37.1 | 31.1 | 31.8 | 78.1 | 18.4 | 3.5 | 9.3 | Ortho. |
| α-(p-Cumyl)ethylamine | 37.1 | 31.1 | 31.8 | 89.4 | 7.6 | 3.0 | 12.3 | Ortho. |
| α-(p-ter-Butylphenyl)ethylamine. | 37.1 | 31.1 | 31.8 | 83.2 | 13.1 | 3.7 | 6.8 | Ortho. |
| α-(p-Nonylphenyl)ethylamine | 34.1 | 31.9 | 34.0 | 9.2 | 30.5 | 60.3 | 5.5 | Para. |
| α-(p-Tolyl)butylamine | 33.9 | 31.7 | 34.4 | 57.3 | 31.3 | 11.4 | 8.9 | Ortho. |
| α-(p-Tolyl)heptylamine | 34.1 | 31.9 | 34.0 | 29.7 | 59.5 | 10.8 | 6.0 | Meta. |
| α-(p-Fluorophenyl)ethylamine | 35.8 | 31.4 | 32.8 | 33.3 | 27.2 | 39.5 | 11.1 | Para. |
| α-(o-Chlorophenyl)ethylamine | 35.8 | 31.4 | 32.8 | 36.2 | 20.0 | 43.8 | 9.3 | Para. |
| α-(p-Chlorophenyl)ethylamine | 34.2 | 30.1 | 35.7 | 26.5 | 26.5 | 47.0 | 17.7 | Para. |
| α-(m-Bromophenyl)ethylamine | 34.1 | 31.9 | 34.0 | 9.1 | 8.6 | 82.3 | 7.5 | Para. |
| α-(p-Bromophenyl)ethylamine | 34.2 | 30.1 | 35.7 | 4.8 | 27.3 | 67.9 | 9.8 | Para. |
| α-(p-Iodophenyl)ethylamine | 35.8 | 31.4 | 32.8 | 37.9 | 22.9 | 39.2 | 15.3 | Para. |
| α-(p-Chlorophenyl)propylamine. | 34.1 | 31.9 | 34.0 | 11.9 | 38.6 | 49.5 | 13.3 | Para >meta. |
| α-(m-Bromophenyl)propylamine. | 34.1 | 31.9 | 34.0 | 74.9 | 15.2 | 9.9 | 9.7 | Ortho. |
| α-(p-Bromophenyl)propylamine. | 34.3 | 33.6 | 32.1 | 26.9 | 26.3 | 46.8 | 8.5 | Para. |
| α-(p-Bromophenyl)butylamine | 34.8 | 31.5 | 33.7 | 61.0 | 30.6 | 8.4 | 8.0 | Ortho. |
| α-(p-Chlorophenyl)amylamine | 34.1 | 31.9 | 34.0 | 19.3 | 32.6 | 48.1 | 13.9 | Para. |
| α-(p-Bromophenyl)amylamine | 33.9 | 31.7 | 34.4 | 16.2 | 33.9 | 49.9 | 14.4 | Para. |
| α-(p-Fluorophenyl)isoamylamine. | 34.1 | 31.9 | 34.0 | 45.6 | 36.3 | 18.1 | 16.2 | Ortho >meta. |
| α-(p-Chlorophenyl)isoamylamine. | 34.3 | 33.3 | 32.4 | 85.5 | 5.6 | 8.9 | 11.3 | Ortho. |
| α-(p-Bromophenyl)isoamylamine. | 33.9 | 31.7 | 34.4 | 85.5 | 11.1 | 3.4 | 8.7 | Ortho. |
| α-(p-Chlorophenyl)hexylamine | 34.1 | 31.9 | 34.0 | 26.1 | 46.1 | 27.8 | 14.0 | Meta. |
| α-(p-Bromophenyl)hexylamine | 34.3 | 33.6 | 32.1 | 28.3 | 44.0 | 27.7 | 11.9 | Meta. |
| α-(m-Bromophenyl)heptylamine. | 34.1 | 31.9 | 34.0 | 62.5 | 23.9 | 13.6 | 7.2 | Ortho. |
| α-(p-Bromophenyl)heptylamine. | 34.3 | 33.3 | 32.4 | 7.0 | 65.5 | 27.5 | 6.8 | Meta. |
| α-(p-Bromophenyl)nonylamine | 34.5 | 32.1 | 33.4 | 30.8 | 34.2 | 35.0 | 11.0 | |
| α-(p-Methoxyphenyl)ethylamine. | 34.2 | 30.1 | 35.7 | 50.7 | 36.3 | 13.0 | 15.6 | Ortho >meta. |
| α-(m-Nitrophenyl)ethylamine | 35.8 | 31.4 | 32.8 | 21.9 | 14.0 | 64.1 | 9.1 | Para. |

$C_p$*=percent by weight of clathrated xylenes in the clathrate.

*Example 5*

Under the same conditions as in the previous example, a mixture of xylenes and ethylbenzene, having the composition shown in Table III (similar in composition to fractions obtained in the catalytic reforming of naphtha) was clathrated. Furthermore, repeated clathrations can obviously lead to a pronounced enrichment of a particular component of the mixture.

TABLE III

| X in Ni(SCN)$_2$X$_4$ | Composition (in weight percent) of clathrated mixture (o-xylene, m-xylene, p-xylene, ethylbenzene) | | | | $C_p$* | Isomer(s) selectively clathrated |
|---|---|---|---|---|---|---|
| | Starting mixture | | | | | |
| | 18.0 | 47.6 | 23.1 | 11.3 | | |
| α-phenylethylamine | 41.3 | 31.9 | 20.0 | 6.8 | 23.7 | Ortho>. |
| α-phenylpropylamine | 7.8 | 36.7 | 46.9 | 8.6 | 30.3 | Para. |
| α-(p-tolyl)ethylamine | 39.4 | 23.7 | 18.7 | 18.2 | 16.8 | Ortho, eth. benz. |
| α-(p-bromophenyl)ethylamine | 5.0 | 44.9 | 45.1 | 5.0 | 18.9 | Para. |

$C_p$*=Percent by weight of clathrated hydrocarbon in the clathrate.

Example 6

A mixture of the three chlorotoluenes was clathrated by a number of the Werner complexes of the present invention. The procedure was the same as that employed in clathrating the mixture of xylenes in Example 4. The results are set out in Table IV. These results show that non-hydrocarbon aromatic substances are also able to be clathrated by the process according to the present invention, the selectivity of the various Werner complexes for the chlorotoluenes being approximately the same as for the xylenes.

Example 7

A mixture of the three isomeric cymenes was clathrated by a number of the Werner complexes of the present invention. The procedure was the same as that employed in clathrating the mixture of xylenes in Example 4. The results obtained are set out in Table V from which it is evident that the ortho-isomer is generally clathrated selectively. Starting from a mixture containing about 40% of this isomer, such as is obtained in the reaction between toluene and isopropanol in the presence of chlorosulphonic acid, it is possible in a small number of successive clathration operations, for example two or three when using the complex $[Ni(SCN)_2(\alpha\text{-phenylethylamine})_4]$, to obtain o-cymene in a state of high purity.

TABLE V

| X in Ni(SCN)$_2$ X$_4$ | Weight percent of cymenes (o-, m-, p-) in— | | | | | | $C_p$* | Isomer(s) selectively clathrated |
|---|---|---|---|---|---|---|---|---|
| | Starting mixture | | | Clathrated mixture | | | | |
| α-Phenylethylamine | 41.0 | 20.6 | 38.4 | 91.7 | 6.7 | 1.6 | 10.8 | Ortho. |
| α-Phenylpropylamine | 24.9 | 35.6 | 39.5 | 62.8 | 33.2 | 4.0 | 13.1 | Ortho. |
| α-(p-Tolyl)ethylamine | 31.6 | 32.0 | 36.4 | 56.6 | 17.5 | 25.9 | 19.8 | Ortho. |
| α-(p-Fluorophenyl)ethylamine | 24.9 | 35.6 | 39.5 | 57.8 | 28.5 | 13.7 | 12.2 | Ortho. |
| α-(m-Bromophenyl)ethylamine | 33.6 | 35.5 | 30.9 | 6.2 | 13.9 | 79.9 | 11.8 | Para. |
| α-(p-Bromophenyl)butylamine | 24.9 | 35.6 | 39.5 | 28.6 | 55.8 | 15.6 | 21.5 | Meta>ortho. |
| α-(p-Fluorophenyl)isoamylamine | 33.6 | 35.5 | 30.9 | 80.9 | 17.7 | 1.4 | 13.1 | Ortho. |
| α-(p-Chlorophenyl)isoamylamine | 33.6 | 35.5 | 30.9 | 87.6 | 9.4 | 3.1 | 13.6 | Ortho. |
| α-(p-Bromophenyl)heptylamine | 33.6 | 35.5 | 30.9 | 72.7 | 18.5 | 8.8 | 12.7 | Ortho. |
| α-(m-Nitrophenyl)ethylamine | 33.6 | 35.5 | 30.9 | 8.3 | 21.1 | 70.6 | 7.5 | Para. |

$C_p$* = percent by weight of clathrated cymenes in the clathrate.

Example 8

Table VI shows the results obtained by applying the procedure of the previous examples to the resolution of a mixture of α- and β-methylnaphthalenes. These hydrocarbons are frequently obtained in the form of a mixture from the distillation of coal tar, or from the distillation of aromatic petroleum fractions. However, for certain applications, for example the synthesis of particular compounds, it is necessary to have one of the isomers in the pure state. The results set out in Table VI show that it is possible, using one of the mixtures obtained as a commercial product, to isolate one or other of the isomers by clathration according to the process of the

TABLE IV

| X in Ni(SCN)$_2$ X$_4$ | Weight percent of chlorotoluenes (o-, m-, p-) in— | | | | | | $C_p$* | Isomer(s) selectively clathrated |
|---|---|---|---|---|---|---|---|---|
| | Starting mixture | | | Clathrated mixture | | | | |
| α-Phenylethylamine | 35.0 | 29.8 | 35.2 | 45.5 | 24.1 | 30.4 | 13.1 | Ortho. |
| α-Phenylpropylamine | 35.0 | 29.8 | 35.2 | 19.8 | 25.7 | 54.5 | 14.8 | Para. |
| α-Phenylbutylamine | 34.9 | 31.6 | 33.5 | 19.2 | 10.1 | 70.7 | 11.9 | Para. |
| α-Phenylamylamine | 35.0 | 29.8 | 35.2 | 75.8 | 15.2 | 9.0 | 13.4 | Ortho. |
| α-Phenylhexylamine | 33.4 | 32.2 | 34.4 | 9.5 | 67.6 | 22.9 | 11.7 | Meta>. |
| α-(p-Tolyl)ethylamine | 35.0 | 29.8 | 35.2 | 62.5 | 11.4 | 26.1 | 11.5 | Ortho. |
| α-(m-Bromophenyl)ethylamine | 32.8 | 32.3 | 34.9 | 7.6 | 9.1 | 83.3 | 12.2 | Para. |
| α-(m-Bromophenyl)propylamine | 32.8 | 32.3 | 34.9 | 75.7 | 14.4 | 9.9 | 10.6 | Ortho. |
| α-(p-Bromophenyl)butylamine | 34.9 | 31.6 | 33.5 | 56.7 | 30.2 | 13.1 | 8.5 | Ortho. |
| α-(p-Bromophenyl)isoamylamine | 32.8 | 32.3 | 34.9 | 78.2 | 15.1 | 6.7 | 12.0 | Ortho. |
| α-(m-Nitrophenyl)ethylamine | 33.4 | 32.2 | 34.4 | 16.9 | 14.1 | 69.0 | 8.1 | Para. |

$C_p$* = Percent by weight of chlorotoluenes in the clathrate.

present invention and an appropriate choice of the Werner complex.

recently claimed to be a possible substitute for dimethylterephthalate in making polyester fibers and films.

TABLE VI

| X in Ni(SCN)$_2$ X$_4$ | Weight percent of methylnaphthalenes ($\alpha$-, $\beta$-) in— | | | | C$_p$* | Isomer selectively clathrated |
|---|---|---|---|---|---|---|
| | Starting mixture | | Clathrated mixture | | | |
| p-Methylbenzylamine | 55.5 | 44.5 | 84.2 | 15.8 | 14.1 | Alpha. |
| α-Phenylethylamine | 55.5 | 44.5 | 70.9 | 29.1 | 22.2 | Alpha. |
| α-Phenylpropylamine | 55.2 | 44.8 | 23.1 | 76.9 | 26.5 | Beta. |
| α-Phenylbutylamine | 55.5 | 44.5 | 23.9 | 76.1 | 16.3 | Beta. |
| α-Phenylhexylamine | 55.2 | 44.8 | 17.4 | 82.6 | 13.1 | Beta. |
| α-Phenylheptylamine | 55.2 | 44.8 | 69.3 | 30.7 | 26.1 | Alpha. |
| α-(m-Tolyl)ethylamine | 55.2 | 44.8 | 64.2 | 35.8 | 20.0 | Alpha. |
| α-(p-Tolyl)ethylamine | 55.2 | 44.8 | 72.8 | 27.2 | 19.6 | Alpha. |
| α-(p-Ethylphenyl) ethylamine | 55.2 | 44.8 | 82.2 | 17.8 | 16.5 | Alpha. |
| α-(p-Cumyl)ethylamine | 55.2 | 44.8 | 82.9 | 17.1 | 18.7 | Alpha. |
| α-(p-Tolyl)heptylamine | 55.2 | 44.8 | 72.8 | 27.2 | 20.8 | Alpha. |
| p-Bromobenzylamine | 55.5 | 44.5 | 56.7 | 43.3 | 7.6 | |
| α-(p-Chlorophenyl) ethylamine | 55.5 | 44.5 | 46.8 | 53.2 | 29.0 | Beta. |
| α-(m-Bromophenyl) ethylamine | 55.2 | 44.8 | 23.1 | 76.9 | 17.3 | Beta. |
| α-(p-Bromophenyl) ethylamine | 55.5 | 44.5 | 83.7 | 16.3 | 15.6 | Alpha. |
| α-(p-Bromophenyl) isoamylamine | 55.2 | 44.8 | 80.1 | 19.9 | 12.0 | Alpha. |
| α-(p-Bromophenyl) heptylamine | 55.2 | 44.8 | 24.5 | 75.5 | 12.7 | Beta. |
| p-Dimethylaminobenzylamine | 55.5 | 44.5 | 59.4 | 40.6 | 29.3 | Alpha. |
| α-(p-Butoxyphenyl) ethylamine | 55.2 | 44.8 | 42.4 | 57.6 | 13.1 | Beta. |

C$_p$*=Percent by weight of clathrated methylnaphthalenes in the clathrate.

*Example 9*

A mixture of 2,3- and 2,6-dimethylnaphthalenes was clathrated by a number of the Werner complexes of the present invention. The procedure was essentially the same as that employed for the methylnaphthalenes but all operations were performed at room temperature. Furthermore, in view of their high melting point the dimethylnaphthalenes were dissolved in benzene for clathration. The results are set out in Table VII. They

*Example 10*

Table VIII shows the results obtained in the resolution of several aromatic mixtures using the complex

[Ni(SCN)$_2$ (α-phenylethylamine)$_4$]

The procedure was the same as that employed in the preceding examples. The results show the wide variety of aromatic compounds which may be clathrated by the

TABLE VII

| X in Ni(SCN)$_2$ X$_4$ | Composition (in weight percent) of clathrated mixture (DMN, Benzene) | | Relative percent (in weight) of dimethyl naphthalene isomers (2,3-, 2,6-) | | C$_p$* |
|---|---|---|---|---|---|
| | Starting mixture DMN: 41.8; Benzene: 58.2 | | Starting mixture 2,3-: 49.6; 2,6-: 50.4 | | |
| α-Phenylpropylamine | 94.4 | 5.6 | 42.2 | 57.8 | 18.2 |
| α-Phenylbutylamine | 86.8 | 13.2 | 33.2 | 66.8 | 18.2 |
| α-Phenylhexylamine | 74.8 | 25.2 | 35.1 | 64.9 | 10.1 |
| α-(p-Bromophenyl)ethylamine | 67.3 | 32.7 | 26.4 | 73.6 | 14.7 |
| α-(p-Bromophenyl)butylamine | 58.0 | 42.0 | 6.4 | 93.6 | 17.9 |

C$_p$*=Percent by weight of clathrated hydrocarbons (dimethylnaphthalenes and benzene) in the clathrate.

show that with all complexes tested the selectivity is in favor of the 2,6-isomer, sometimes with a high enrichment. Furthermore, it may be seen that dimethylnaphthalenes are much better clathrated than benzene though this is present in high concentration in the starting mixture. 2,6-dimethylnaphthalene may be used to produce dimethyl-naphthalene-2,6-dicarboxylate which has been present process and also the strong selectivities exhibited by the complex even with isomers of very similar structure. It must be noted that the choice of the complex was made arbitrarily. From the preceding tables, it is evident that for certain mixtures, other complexes conforming to the invention would give still better results.

TABLE VIII

| Composition (in mole percent) of— | | | | $C_p{}^*$ |
|---|---|---|---|---|
| Starting material | Clathrated mixture | | | |
| Propylbenzenes: n-: 50.4; iso-: 49.6 | | 20.3 | 79.7 | 10.9 |
| Butylbenzenes: n-: 26.9; iso-: 27.1 sec-: 21.7; ter-: 24.3 | 15.8 | 17.8 | 19.6 | 46.7 | 17.1 |
| Xylenes: See Table II. | | | | |
| Styrene: 47.9; Ethylbenzene: 52.1 | | 79.0 | 21.0 | 16.9 |
| Diethylbenzenes: o-: 31.8; m-: 31.2; p-: 37.0 | | 92.6 | 4.2 | 3.2 | 8.6 |
| Ethyltoluenes: o-: 33.5; m-: 33.9; p-: 32.6 | | 74.3 | 17.7 | 8.0 | 13.9 |
| Cymenes: See Table V. | | | | |
| Ethylisopropylbenzenes: o-: 23.7; m-: 20.6; p-: 55.7 | | 79.9 | 13.4 | 6.7 | 9.7 |
| Cyclohexyltoluenes: o-: 28.6; m-: 15.8; p-: 55.6 | | 85.8 | 6.7 | 7.5 | 17.5 |
| Chlorotoluenes: o-: 35.0; m-: 29.8; p-: 35.2 | | 45.5 | 24.1 | 30.4 | 13.1 |
| Bromotoluenes: o-: 32.9; m-: 32.5; p-: 34.6 | | 68.6 | 14.4 | 17.0 | 23.5 |
| Dichlorobenzenes: o-: 50.3; p-: 49.7 | | 85.4 | | 14.6 | 14.2 |
| Trimethylbenzenes: 1,2,3-: 34.6; 1,2,4-: 31.6 1,3,5-: 33.8 | | 83.7 | 13.3 | 3.0 | 17.8 |
| o-Ethyltoluene: 51.2; Mesitylene: 48.8 | | 98.2 | | 1.8 | 13.9 |
| Dimethylethylbenzenes: | | | | |
| 1,2-diMe, 4-Et.: 50.0 1,4-diMe, 2-Et.: 50.0 | | 30.1 | | 69.9 | 8.6 |
| 1,3-diMe, 4-Et.: 50.0 1,4-diMe, 2-Et.: 50.0 | | 18.0 | | 82.0 | 10.3 |
| 1,3-diMe, 2-Et.: 7.0 1,3-diMe, 4-Et.: 54.3 1,3-diMe, 5-Et.: 38.7 | | 38.3 | 36.4 | 25.3 | 11.2 |
| Naphthalene: 32.6; Tetraline: 34.1; Decaline: 33.3 | | 84.9 | 12.9 | 2.2 | 16.2 |
| Naphthalene: 50.0; diphenyle: 50.0 | | 98.5 | | 1.5 | 16.2 |
| Methylnaphthalenes: See Table VI. | | | | |
| Ethylnaphthalenes: α-: 49.1; β-: 50.9 | | 69.9 | 33.1 | | 20.2 |

$C_p{}^*$ = Percent by weight of calthrated compounds in the clathrate.

*Example 11*

This example illustrates one method by which aromatic compounds which have been clathrated by the process of any of the previous examples can be recovered from the clathrate without decomposition of the Werner complex with which they form a clathrate.

32.5 g. of an o-xylene[Ni(SCN)$_2$ (α-phenylethylamine)$_4$] clathrate, produced by the process of Example 2, were so placed in a vertical glass column that the clathrate was in contact with a continuous current of water vapor heated to a temperature of about 60° C., which passed through the column. At the outlet of this column the water was condensed and could be eventually recycled. The complete apparatus was maintained under reduced pressure, in the present example at a pressure of 30 mm. Hg. During its passage through the column the water vapor carried off the clathrated hydrocarbon, and on condensing this water vapor containing the free hydrocarbon, the hydrocarbon separated into a supernatant organic phase which was easily separable by decantation. During this process several fractions of the condensate were collected and analyzed for their content of water, o-xylene and amine. The results obtained are set out in Table IX. These results show that the whole of the o-xylene was removed from the clathrate in approximately one hour by approximately its own weight of water. During the same period only 2% of the amine forming part of the complex was obtained in the condensate.

TABLE IX

| Time (mins.) | H$_2$O used (g.) | o-Xylene removed from clathrate | | Amine removed from complex | |
|---|---|---|---|---|---|
| | | G. | Percent of total o-xylene in clathrate | G. | Percent of total amine in complex |
| 25 | 1.09 | 1.75 | 32 | 0.085 | 0.4 |
| 50 | 3.13 | 4.53 | 83 | 0.217 | 1.1 |
| 70 | 7.79 | 5.48 | 100 | 0.434 | 2.2 |
| 90 | 11.36 | 5.48 | 100 | 0.533 | 2.7 |

*Example 12*

This example illustrates one method by which aromatic compounds which have been clathrated by the process of any of the examples from 1 to 10 can be recovered by elution at a temperature not above the temperature of formation of the clathrate and without decomposition of the Werner complex with which the clathrate has been formed.

25.0 g. of a xylenes-[Ni(SCN)$_2$ (α-phenylethylamine)$_4$] clathrate, produced by clathrating a mixture of o- and m-xylene (30% and 70% respectively) are put in a vertical glass column. Heptane containing 0.1 mole of α-phenylethylamine per liter is slowly and continuously introduced at the top of the column. At the bottom of the column fractions are collected at regular intervals and analyzed by vapor phase chromatography. The results obtained are set out in Table X. These results show that it is possible to remove the whole of the clathrated xylenes by elution with an inert solvent at a temperature not above that used during the clathration process. The small quantity of amine added to the elution solvent completely suppresses the dissociation of the 4-base complex. Results show that in some cases the elution process brings about a further separation of the clathrated compounds; in the present case fractions from 4 to 11 are richer in o-xylene than the mean composition of clathrated xylenes.

TABLE X

| Fraction No. | Weight of the Fraction (g.) | Percent by weight of xylenes in the fraction | Relative percentage by weight of xylenes[1] | |
|---|---|---|---|---|
| | | | o- | m- |
| 1 | 4.48 | 36.4 | 40 | 60 |
| 2 | 4.24 | 24.6 | 49 | 51 |
| 3 | 3.27 | 21.3 | 55 | 45 |
| 4 | 3.96 | 18.4 | 59 | 41 |
| 5 | 4.35 | 16.5 | 60 | 40 |
| 6 | 4.83 | 10.1 | 63 | 37 |
| 7 | 5.00 | 8.8 | 61 | 39 |
| 8 | 5.11 | 6.5 | 61 | 39 |
| 9 | 6.36 | 3.3 | 62 | 38 |
| 10 | 4.22 | 2.0 | 61 | 39 |
| 11 | 4.67 | 0.2 | 63 | 37 |

[1] Mean composition of the clathrated xylenes as shown by direct analysis of the clathrate: o-, 57%; m-, 43%.

(B) EXAMPLES BASED ON POLYALKYLPHENYL-ALKYLAMINE COMPLEXES

*Example 13*

This example illustrates the separation of p-dichlorobenzene out of its isomers by clathration with a polyalkylphenyl amine.

To a 15% solution of $Ni(SCN)_2$ prepared from $$NiCl_2 \cdot 6H_2O$$

employing the same complex or other complexes according to the invention; the results of such clathrations are summarized together with the preceding results in Table XI.

TABLE XI

| Aminated base of the 4-base complex | Composition of the feed (moles percent) | Composition of the clathrated mixture (moles percent) | Clathrated compounds in the clathrate (weight percent) |
|---|---|---|---|
| α-(3,4-dimethylphenyl) ethylamine. | Dichlorobenzenes:<br>o-: 33<br>m-: 33<br>p-: 34 | 3<br>4<br>93 | 15.7 |
| α-(3,5-dimethylphenyl) ethylamine. | Dichlorobenzenes:<br>o-: 33<br>m-: 33<br>p-: 34 | 35<br>33<br>32 | 7.7 |
| α-(3,4,5-trimethylphenyl) ethylamine. | Dichlorobenzenes:<br>o-: 33<br>m-: 33<br>p-: 34 | 39<br>30<br>31 | 5.1 |
| | Nitrotoluenes:<br>o-: 29<br>m-: 36<br>p-: 35 | 35<br>35<br>30 | 10.1 |
| | Toluene: 51<br>Benzotrifluoride: 49 | 23<br>77 | 8.5 |
| α-(3,4-dimethylphenyl) butylamine. | Dichlorobenzenes:<br>o-: 32<br>m-: 34<br>p-: 34 | 36<br>23<br>41 | 8.9 |
| α-(3,4,5-triethylphenyl) ethylamine. | Dichlorobenzenes:<br>o-: 32<br>m-: 34<br>p-: 34 | 40<br>28<br>32 | 12.1 |
| | Nitrotoluenes:<br>o-: 32<br>m-: 35<br>p-: 33 | 39<br>30<br>31 | 11.2 |
| | Toluene: 52<br>Benzotrifluoride: 48 | 43<br>57 | 6.9 |
| α-(3,4-dimethylphenyl) butylamine. | Trichlorobenzenes:<br>1,2,3: 49<br>1,2,4: 51 | 61<br>39 | 18.4 |
| α-(3,4-dimethylphenyl) heptylamine. | Chlorotoluenes:<br>o-: 33<br>m-: 32<br>p-: 35 | 49<br>25<br>26 | 20.3 |
| | Dichlorobenzenes:<br>o-: 32<br>m-: 34<br>p-: 34 | 45<br>28<br>27 | 26.1 |
| α-(3,4,5-trimethylphenyl) propylamine. | Nitrotoluenes:<br>o-: 32<br>m-: 36<br>p-: 32 | 33<br>35<br>32 | 7.5 |
| | Dichlorobenzees:<br>o-: 31<br>m-: 34<br>p-: 35 | 33<br>33<br>34 | 6.8 | and 2 molar equivalents of KSCN it is gradually added, with stirring at the ice bath temperature, 4 molar equivalents of α-(3,4-dimethylphenyl)ethylamine plus a 12% excess of the amine in order to ensure formation of only the 4-base complex. The added amine is diluted in about three times its own volume of a mixture of dichlorobenzenes (mole percent of isomers: o-, 33; m-, 33; p-, 34) and n-heptane (3/1 in volume). Heptane is used as solvent of the dichlorobenzenes in order to avoid precipitation of the para-isomer. After stirring the reaction mixture for 30 minutes, the resulting precipitate is separated by filtration, washed twice in the cold by suspension in heptane and in pentane and finally it is dried in the air. A 3 g. aliquot of the dry precipitate is decomposed by 10 ml. of 20% sulfuric acid. After decomposition, the sulfuric acid is diluted by 20 ml. of distilled water and the clathrated dichlorobenzenes are extracted by 10 ml. of cyclohexane and analyzed by spectrophotometry. It is thus found that 15.7 w. percent of the precipitate are dichlorobenzenes with a strong enrichment of the para isomer (in mole percent: o-, 3; m-, 4; p-, 93). Further analysis of the precipitate shows that the remainder consists essentially of the 4-base complex $$[Ni(SCN)_2(amine)_4]$$

Other resolutions of mixtures of polar substituted aromatic compounds are realized by the same procedure Substantially the same results as those of Table XI are obtained by contacting any of the complexes $[Ni(SCN)_2(amine)_4]$ and the mixture to be resolved; nevertheless, a simple contactting will generally not bring about the formation of the clathrate; it is thus an embodiment of of this invention to heat the mixture up to a temperature at which all the complex $[Ni(SCN_2(amine)_4]$ is dissociated into the complex $[Ni(SCN)_2(amine)_2]$ and free amine, then cooling in order to form the clathrate of the complex $[Ni(SCN)_2(amine)_4]$ with the clathratable aromatic compound. An alternative method for getting the same results is obviously to add to the mixture containing the complex $[Ni(SCN)_2(amine)_2]$ and at least one clathratable aromatic compound two molar equivalents of the said amine thereby forming the clathrate of the complex $[Ni(SCN)_2(amine)_4]$ with the said clathratable aromatic compound. For both methods it is convenient to add an excess of amine corresponding to the dissociation of the 4-base complex at the clathration temperature in order to get a maximum capacity of clathration.

In Example 13 hereinabove, one uses a diluted acid in order to destroy the clathrate and to recover the clathrated compound; this destructive method is of course only suitable for analytical purpose; for industrial purpose it is more advantageous to use a method which does not destroy the 4-base complex or at least the 2-base complex. This may be done by heating the clathrate to a temperature at which it is destroyed but not the complex. For instance, one can remove the clathrated compound out of the clathrate by steam stripping under reduced pressure at a temperature such as the 4-base complex remains unaltered or at a higher temperature such as 2 molar equivalents of the amine are removed together with the clathrated compound leaving the complex [Ni(SCN)$_2$(amine)$_2$]. In both cases the remaining complexes are ready for a new clathration step by one of the alternative methods given hereinabove. Another, and even preferred, method of recovery of the clathrated compound without destruction of the 4-base complex is by elution with an inert solvent, much the same as in chromatography. For instance, if the clathrate is dispersed in an inert aliphatic solvent such as heptane which may possibly contain a small amount of amine corresponding to the dissociation of the 4-base complex, the clathrate will loose its clathrated compound, leaving finally the unaltered complex [Ni(SCN)$_2$(amine)$_4$] which is thus ready for a new clathration.

Those clathration and recovery processes using the new complexes will now be described with reference to the following examples.

*Example 14*

This example illustrates the preparation of clathrates by the conversion of 2-base complexes into the corresponding 4-base complexes in the presence of a mixture to be clathrated.

The 2-base complex [Ni(SCN)$_2$\{α-(3,4-dimethylphenyl ethylamine\}$_2$] is first prepared from its chemical components. To a 15% solution of Ni(SCN)$_2$ prepared from NiCl$_2$.6H$_2$O and 2 molar equivalents of KSCN are added one volume of heptane and one half volume of chloroform. To the biphasic mixture thus obtained are then added gradually and with stirring, 2 molar equivalents of α-(3,4-dimethylphenyl) ethylamine dissolved in about its own volume of chloroform. After stirring the reaction mixture for 30 minutes, the precipitate formed is filtered off, washed once by suspension in a 1/1 heptane-water mixture, washed a second time in chloroform and finally it is dried under vacuum at 100° C. for 2 hours. The complex obtained is in the form of a pale green powder.

The use of chloroform in the above process is justified by its property of decomposing most of the 4-base complexes of the present invention into the corresponding 2-base complexes so that the latter are obtained, when chloroform is present, in a state of high purity.

To carry out the clathration, the complex [Ni(SCN)$_2$\{α-(3,4-dimethylphenyl ethylamine\}$_2$] prepared as hereinbefore described is suspended at the ice bath temperature in about ten times its weight of a mixture of dichlorobenzenes (mole percent of isomers: o-, 31; m-, 34; p-, 35) and n-heptane (3/1 in volume). To that suspension are then added 2 molar equivalents of α-(3,4-dimethylphenyl) ethylamine plus an excess corresponding to a final concentration of about 0.2 mole of free amine per liter of suspension medium for bringing about complete conversion of the 2-base complex into the 4-base complex. This conversion occurs shortly after the addition of the amine and it is made apparent by the formation of a blue precipitate. After agitating the reaction mixture for about one hour, the precipitate is filtered off, washed twice in the cold by suspension in heptane and in pentane and finally it is dried in the air at room temperature.

For evidencing the clathrate formation, the dry precipitate is treated as in the preceding example. It is thus shown that 14.5 w. percent of the precipitate consists essentially of p-dichlorobenzene (in mole percent: o-, 2; m-, 3; p-, 95).

*Example 15*

This example demonstrates how the clathration illustrated in the previous example can be carried out by forming the 2-base complex "in situ" from the 4-base complex by heating the latter, in the presence of the compounds to be clathrated, at a temperature sufficient to bring about its complete dissociation into the corresponding 2-base complex and free amine, and then cooling the mixture to reform a 4-base complex which is capable of clathrating.

The 4-base complex [Ni(SCN)$_2$\{α-(3,4-dimethylphenyl)ethylamine\}$_4$] is first prepared from its chemical components. A 15% solution of Ni(SCN)$_2$ is prepared as in the preceding examples and one half volume of n-heptane is added to this solution. To the biphasic mixture so obtained are then added, gradually and with stirring, 4 molar equivalents of the amine plus a 12% excess in order to ensure complete formation of the 4-base complex. The added amine is diluted in about its own volume of n-heptane. The use of heptane in this preparation is justified by the experimental fact that the presence of a liquid hydrocarbon results in a higher degree of purity of the complex so obtained. In this example, the heptane used is distributed between the Ni(SCN)$_2$ solution and the amine to be added, but it may also be entirely added with the amine. After stirring for 30 minutes, the resulting precipitate is filtered off, washed by suspension in a 1/1 mixture heptane-water, and finally it is dried for 2 hours under vacuum at room temperature.

To carry out the clathration, the complex [Ni(SCN)$_2$\{α-(3,4-dimethylphenyl)ethylamine\}$_4$] prepared as hereinabove described is suspended in a mixture of dichlorobenzenes and heptane as in the previous example. The ratio complex/suspension medium is chosen so that a fluid slurry is obtained (5 to 10 ml. of suspension medium per gram of complex). An excess of amine of about 0.2 mole per liter of suspension medium is added to the system in order to ensure the complete reformation of the 4-base complex. The suspension is then heated with stirring at a temperature of 95° C. During the course of this heating, the original blue complex is rapidly converted into the corresponding 2-base complex which appears as a green precipitate. After one hour at 95° C., the reaction mixture is cooled at the ice bath temperature. By this cooling, the 2-base complex recombines with free amine to form a 4-base complex, this transformation being made apparent by a rapid change of color of the suspension from green to blue. After maintaining the suspension at about 0° C. for one hour, the resulting clathrate is filtered off and treated as in the preceding example.

The analysis shows that 13.4 wt. percent of the dry clathrate are substantially pure p-dichlorobenzene (mole percent: o-, 2; m-, 2; p-, 96).

*Example 16*

This example illustrates one method by which aromatic compounds clathrated by the process of any of the preceding examples can be recovered by elution with an inert solvent, without decomposition of the Werner complex with which the clathrate has been formed.

10.0 g. of the clathrate prepared according to the previous example are suspended at room temperature in 100 ml. of n-heptane containing dissolved free amine in the amount of 0.3 mole per liter in order to avoid the dissociation of the 4-base complex. After stirring the suspension for about three hours, the precipitate is filtered off, washed with cold pentane and dried in the air.

By decomposing an aliquot of the precipitate with H$_2$S$_4$O 20%, it is made evident that it is free of clathrated material, that is to say, that by the above treatment the dichlorobenzenes have been completely removed from the clathrate. Further analysis of the resulting precipitate shows it consists of the pure 4-base complex.

(C) EXAMPLES BASED ON 3,4-DIHALOPHENYL-ALKYLAMINE COMPLEXES

*Example 17*

This example illustrates the separation of para-diisopropylbenzene out of its isomers by clathration with one of the new Werner complexes based on 3,4-dihalophenyl-alkylamines. Para-diisopropylbenzene in admixture with its isomers is found as a by-product of the synthesis of cumene. It is a valuable starting material for the synthesis of terephthalic acid.

To a 15% solution of $Ni(SCN)_2$ prepared from $NiCl_2.6H_2O$ and 2 molar equivalents of KSCN it is gradually added, at the ice bath temperature, with stirring, 4 molar equivalents of α-(3,4-dichlorophenyl)butylamine plus a 12% excess of the amine in order to ensure formation of only the 4-base complex. The added amine is diluted in about three times its own volume of the mixture of diisopropylbenzenes to be clathrated (in mole percent O-, 12; m-, 29; p-, 59). After stirring the reaction mixture for 30 minutes, the resulting precipitate is separated by filtration, washed twice in the cold by suspension in heptane and in pentane and finally it is dried in the air. A 3 g. aliquot of the dry precipitate is decomposed by 10 ml., of 50% acetic acid. After decomposition, the acetic acid is diluted by 20 ml. of distilled water and the clathrated hydrocarbons are extracted by 10 ml. of p-xylene and analyzed by vapor phase chromatography. It is thus found that 14.3 w. percent of the precipitate are diisopropylbenzenes with a strong enrichment of the para isomer (in mole percent: O-, 3; m-, 11; p-, 86). Further analysis of the precipitate shows that the remainder consists essentially of the 4-base complex $[Ni(SCN)_2 \text{ (amine)}_4]$.

Other resolutions of mixtures of aromatic compounds are realized by the same procedure employing the same complex or other complexes according to the invention; results of such clathrations are summarized together with the preceding results in Table XII.

complex $[Ni(SCN)_2 \text{ (amine)}_4]$ with the clathratable aromatic compound. An alternative method for getting the same results is obviously to add to the mixture containing the complex $[Ni(SCN)_2 \text{ (amine)}_2]$ and at least one clathratable aromatic compound two molar equivalents of the said amine thereby forming the clathrate of the complex $[Ni(SCN)_2 \text{ (amine)}_4]$ with the said clathratable aromatic compound. For both methods it is convenient to add an excess of amine corresponding to the dissociation of the 4-base complex at the clathration temperature in order to get a maximum capacity of clathration.

In Example 17 hereinabove, one uses a diluted acid in order to destroy the clathrate and to recover the clathrated compound: this destructive method is of course only suitable for analytical purpose; for industrial purpose it is more advantageous to use a method which does not destroy the 4-base complex or at least the 2-base complex. This may be done by heating the clathrate to a temperature at which it is destroyed but not the complex. For instance, one can remove the clathrated compound out of the clathrate by steam stripping under reduced pressure at a temperature such as the 4-base complex remains unaltered or at a higher temperature such as two molar equivalents of the amine are removed together with the clathrated compound leaving the complex $[Ni(SCN)_2 \text{ (amine)}_2]$. In both cases the remaining complexes are ready for a new clathration step by one of the alternative methods given hereinabove. Another, and even preferred, method of recovery of the clathrated compound without destruction of the 4-base complex is by elution with an inert solvent, much the same as in chromatography. For instance, if the clathrate is dispersed in an inert aliphatic solvent such as heptane which may possibly contain a small amount of amine corresponding to the dissociation of the 4-base complex, the clathrate will loose its clathrated compound, leaving finally the un-

TABLE XII

| Aminated base of the 4-bsae complex | Composition of the feed (mole percent) | Composition of the clathrated mixture (mole percent) | Clathrated compounds in the clathrate (weight percent) |
| --- | --- | --- | --- |
| α-(3,4-dichlorophenyl) ethylamine. | Cymenes: | | |
| | o=33 | 35 | |
| | m=34 | 33 | 20.3 |
| | p=33 | 32 | |
| α-(3,4-dichlorophenyl) butylamine. | Ethylisopropyl benzenes: | | |
| | o=24 | 12 | |
| | m=20 | 13 | 23.8 |
| | p=56 | 75 | |
| | Diisopropylbenzenes: | | |
| | o=12 | 3 | |
| | m=29 | 11 | 14.3 |
| | p=59 | 86 | |
| | Cyclohexyltoluenes: | | |
| | o=5 | 5 | |
| | m=16 | 8 | 20.9 |
| | p=79 | 87 | |
| α-(3,4-dichlorophenyl) heptylamine. | Cymenes: | | |
| | o=33 | 36 | |
| | m=34 | 31 | 11.0 |
| | p=33 | 33 | |
| | Methylnaphthalenes: | | |
| | 1-=57 | 91 | |
| | 2-=43 | 9 | 12.1 |
| α-(3,4-dibromophenyl) ethylamine. | Cymenes: | | |
| | o=33 | 41 | |
| | m=34 | 30 | 15.2 |
| | p=33 | 29 | |
| | Cyclohexyltoluenes: | | |
| | o=44 | 49 | |
| | m=24 | 23 | 24.4 |
| | p=32 | 28 | |

Substantially the same results as those of Table XII are obtained by contacting any of the complexes $[Ni(SCN)_2 \text{ (amine)}_4]$ and the mixture to be resolved; nevertheless a simple contacting will generally not bring about the formation of the clathrate. It is thus an embodiment of this invention to heat the mixture up to a temperature at which all the complex $[Ni(SCN)_2 \text{ (amine)}_4]$ is dissociated into the complex $[Ni(SCN)_2 \text{ (amine)}_2]$ and free amine, then cooling in order to form the clathrate of the altered complex $[Ni(SCN)_2 \text{ (amine)}_4]$ which is thus ready for a new clathration.

Those clathration and recovery processes using the new complexes will now be described with reference to the following examples.

*Example 18*

This example illustrates the preparation of clathrates by the conversion of 2-base complexes into the corresponding 4-base complexes in the presence of a mixture to be clathrated.

The 2-base complex [Ni(SCN)$_2${α-(3,4-dichlorophenyl)butylamine}$_2$] is first prepared from its chemical components. To a 15% solution of Ni(SCN)$_2$ prepared from NiCl$_2$.6H$_2$O and 2 molar equivalents of KSCN are added one volume of heptane and one half volume of chloroform. To the biphasic mixture so obtained are then added, gradually and with stirring, 2 molar equivalents of α-(3,4-dichlorophenyl) butylamine dissolved in about its own volume of chloroform. After stirring the reaction mixture for 30 minutes, the precipitate formed is filtered off, washed once by suspension in a 1/1 heptane-water mixture, washed a second time in chloroform and finally it is dried under vacuum at 100° C. for 2 hours. The complex obtained is in the form of a pale green powder.

The use of chloroform in the above process is justified by its property of decomposing most of the 4-base complexes of the present invention into the corresponding 2-base complexes so that the latter are obtained, when chloroform is present, in a state of high purity.

To carry out the clathration, the complex [Ni(SCN)$_2$-{α-(3,4-dichlorophenyl)butylamine}$_2$] prepared as hereinbefore described is suspended in about 10 times its own weight of a mixture of diisopropylbenzenes (in mole percent: o-, 13; m-, 32; p-, 55). To that suspension are then added 2 molar equivalents of α-(3,4-dichlorophenyl) butylamine plus an excess corresponding to a final concentration of about 0.2 mole of free amine per liter of hydrocarbons for bringing about complete conversion of the 2-base complex into the 4-base complex. This conversion occurs shortly after the addition of the amine and it is made apparent by the formation of a blue precipitate. After agitating the reaction mixture for about one hour, the precipitate is filtered off, washed twice in the cold by suspension in heptane and in pentane and finally it is dried in the air at room temperature.

The clathrate so obtained is treated and analyzed as in the preceding example. It is thus shown that 18.2% of its weight consist of diisopropylbenzenes substantially enriched in the para-isomer (in mole percent: o-, 6; m-, 16; p-, 78).

*Example 19*

This example demonstrates how the clathration illustrated in the previous example can be carried out by forming the 2-base complex "in situ" from the 4-base complex by heating the latter, in the presence of the compound to be clathrated, at a temperature sufficient to bring about its complete dissociation into the corresponding 2-base complex and free amine, and then cooling the mixture to reform a 4-base complex which is capable of clathration.

The 4-base complex [Ni(SCN)$_2${α-(3,4-dichlorophenyl) butylamine}$_4$] is first prepared from its chemical components. A 15% solution of Ni(SCN)$_2$ is prepared as in the preceding examples and one half volume of n-heptane is added to this solution. To the biphasic mixture so obtained are then added, gradually and with stirring, 4 molar equivalents of the amine plus a 12% excess in order to ensure complete formation of the 4-base complex. The added amine is diluted in about its own volume of n-heptane. The use of heptane in this preparation is justified by the experimental fact that the presence of a liquid hydrocarbon results in a higher degree of purity of the complex so obtained. In this example, the heptane used is distributed between the Ni(SCN)$_2$ solution and the amine to be added but it may also be entirely added with the amine.

After stirring for 30 minutes, the resulting precipitate is filtered off, washed by suspension in a 1/1 mixture heptane-water and finally it is dried for 2 hours under vacuum at room temperature.

To carry out the clathration, the complex [Ni(SCN)$_2$-{α-(3,4-dichlorophenyl)ethylamine}$_4$] prepared as hereinabove described is suspended in the same mixture of di-isopropylbenzenes as in the previous example. The ratio complex/hydrocarbons is chosen so that a fluid slurry is obtained (5 to 10 ml. of hydrocarbons per gram of complex). An excess of amine of about 0.2 mole per liter of hydrocarbons is added to the system in order to ensure the complete reformation of the 4-base complex. The suspension is then heated with stirring at a temperature of 95° C. During the course of this heating, the original blue complex is rapidly converted into the corresponding 2-base complex which appears as a green precipitate. After one hour at 95° C. the reaction mixture is cooled at room temperature. By this cooling, the 2-base complex recombines with the free amine to form a 4-base complex, this transformation being made apparent by a rapid color change of the suspension from green to blue. After maintaining the suspension at room temperature for one hour, the resulting clathrate is filtered off and treated as in the preceding examples.

The analysis shows that 17.9 w. percent of the dry clathrate are diisopropylbenzenes strongly enriched in the para-isomer (in mole percent: o-, 5; m-, 16; p-, 79).

*Example 20*

This example illustrates one method by which aromatic compounds clathrated by the process of any of the preceding examples can be recovered by elution with an inert solvent, without decomposition of the Werner complex used in the clathration step.

10.0 g. of the clathrate prepared according to the previous example are suspended at room temperature in 100 ml. of n-heptane containing dissolved amine in the amount of 0.1 mole per liter in order to avoid the dissociation of the 4-base complex. After stirring the suspension for about one hour, the precipitate is filtered off, washed with cold pentane and dried in the air.

An aliquot of the dry precipitate is treated as in the preceding examples for determining its content in hydrocarbons. It is thus found that 7.8% of its weight consist of almost pure p-diisopropylbenzene (in mole percent: o-, 0; m-, 6; p-, 94—initially 79). One may thus estimate that during the preceding treatment more than 60% of the clathrated hydrocarbons have been removed from the clathrate.

The remaining of the precipitate is suspended in a fresh elution medium for a further hour and the resulting precipitate analyzed as before. It is now found that the latter consists of the pure 4-base complex.

Obviously, this two steps elution may be effected in a continuous manner, much as in chromatography. It must be noted that with other clathrates, a complete elution may be effected in one single step, depending on the complex used and the nature of the clathrated compounds.

The preceding results also show that in some cases the elution process brings about a further separation of the clathrated compounds; in the present example it is seen that the diisopropylbenzenes desorbed by the second elution are much richer in the para-isomer than are the original clathrated hydrocarbons.

From the foregoing description, one skilled in the art can readily appreciate the essential characteristics, of the invention. It is understood that without departing from the spirit and scope of these essential characteristics, the invention is susceptible to other modifications in order to adapt it to various usages and conditions, and accordingly such modifications should and are intended to be comprehended within the full range of equivalence of the following claims.

What is claimed is:

1. A process of resolving a mixture of organic compounds, said mixture including an aromatic compound selected from the group consisting of benzene, mono-, di- and trialkylbenzenes wherein each alkyl radical has no more than three carbon atoms, ring substituted monohaloderivatives of benzene and of monoalkylbenzenes, dihalobenzenes, styrene, cyclohexyltoluenes, tetraline, naphthalene, and mono- and dialkylnaphthalenes wherein each alkyl radical has no more than three carbon atoms, by clathration of said aromatic compound with a Werner complex $Ni(CNS)_2X_4$ wherein X is a primary arylalkylamine of general formula:

$$R_2-\underset{R_1}{\underset{|}{\overset{H}{\overset{|}{C}}}}-NH_2$$

wherein $R_1$ is a primary alkyl radical of 1 to 6 carbon atoms and $R_2$ is an aromatic radical selected from the group consisting of phenyl, mono-, di- and trialkylsubstituted phenyl radicals wherein substitution occurs at any of the 3, 4 and 5 positions of said phenyl radical, said alkyl substituents having each less than three carbon atoms, phenyl radicals substituted by a polar radical selected from the group consisting of halogen, nitro, alkoxy containing 1 to 5 carbon atoms and N,N-dialkylamino wherein the alkyl portions contain 1 to 2 carbon atoms, and 3,4-diahalophenyl radicals, said resolution comprising heating in the presence of said mixture and Werner complex $Ni(CNS)_2X_4$ in order to dissociate said Werner complex into the corresponding complex $Ni(CNS)_2X_2$ and 2 free moles of the amine X, then cooling thereby forming the clathrate of the Werner complex $Ni(CNS)_2X_4$ with said aromatic compound, and recovering by known methods the selectively absorbed aromatic compound without dissociation of the Werner complex $Ni(CNS)_2X_4$ which remains thus directly available for a further clathration step.

2. A process following claim 1 wherein X is selected from the group consisting of Alpha-phenylethylamine
Alpha-phenylpropylamine
Alpha-phenylbutylamine
Alpha-phenylamylamine
Alpha-phenylisoamylamine
Alpha-phenylhexylamine
Alpha-phenylisohexylamine
Alpha-phenylheptylamine
Alpha-(m-tolyl)ethylamine
Alpha-(p-tolyl)ethylamine
Alpha-(p-ethylphenyl)ethylamine
Alpha-(p-tolyl)butylamine
Alpha-(p-tolyl)heptylamine
Alpha-(p-fluorophenyl)ethylamine
Alpha-(o-chlorophenyl)ethylamine
Alpha-(m-chlorophenyl)ethylamine
Alpha-(p-chlorophenyl)ethylamine
Alpha-(m-bromophenyl)ethylamine
Alpha-(p-bromophenyl)ethylamine
Alpha-(p-iodophenyl)ethylamine
Alpha-(p-chlorophenyl)propylamine
Alpha-(m-bromophenyl)propylamine
Alpha-(p-bromophenyl)propylamine
Alpha-(p-bromophenyl)butylamine
Alpha-(p-chlorophenyl)amylamine
Alpha-(p-bromophenyl)amylamine
Alpha-(p-fluorophenyl)isoamylamine
Alpha-(p-chlorophenyl)isoamylamine
Alpha-(p-bromophenyl)isoamylamine
Alpha-(p-chlorophenyl)hexylamine
Alpha-(p-bromophenyl)hexylamine
Alpha-(m-bromophenyl)heptylamine
Alpha-(p-bromophenyl)heptylamine
Alpha-(p-methoxyphenyl)ethylamine
Alpha-(p-butoxyphenyl)ethylamine
Alpha-(m-nitrophenyl)ethylamine
Alpha-(3,4-dimethylphenyl)ethylamine
Alpha-(3,4-dimethylphenyl)butylamine
Alpha-(3,4-dimethylphenyl)heptylamine
Alpha-(3,5-dimethylphenyl)ethylamine
Alpha-(3,4,5-trimethylphenyl)ethylamine
Alpha-(3,4,5-triethylphenyl)ethylamine
Alpha-(3,4,5-trimethylphenyl)propylamine
Alpha-(3,4-dichlorophenyl)ethylamine
Alpha-(3,4-dibromophenyl)ethylamine
Alpha-(3,4-dichlorophenyl)butylamine
Alpha-(3,4-dichlorophenyl)heptylamine 3. A process of resolving a mixture of organic compounds, said mixture including an aromatic compound selected from the group consisting of benzene, mono-, di- and trialkylbenzenes wherein each alkyl radical has no more than 3 carbon atoms, ring substituted monohaloderivatives of benzene and of monoalkylbenzenes, dihalobenzenes, styrene, cyclohexyltoluenes, tetraline, naphthalene, and mono- and dialkylnaphthalenes wherein each alkyl radical has no more than 3 carbon atoms, by clathration of said aromatic compound with a Werner complex $Ni(CNS)_2X_4$ wherein X is a primary arylalkylamine of general formula:

$$R_2-\underset{R_1}{\underset{|}{\overset{H}{\overset{|}{C}}}}-NH_2$$

wherein $R_1$ is a primary alkyl radical of 1 to 6 carbon atoms and $R_2$ is an aromatic radical selected from the group consisting of phenyl, mono-, di-, and trialkylsubstituted phenyl radicals wherein substitution occurs at any of the 3, 4 and 5 positions of said phenyl radical, said alkyl substituents having each less than 3 carbon atoms, phenyl radicals substituted by a polar radical selected from the group consisting of halogen, nitro, alkoxy containing 1 to 5 carbon atoms and N,N-dialkylamino wherein the alkyl portions contain 1 to 2 carbon atoms, and 3,4-dihalophenyl radicals, said resolution comprising reacting the Werner complex $Ni(CNS)_2X_2$ with 2 moles of the amine X in the presence of the mixture to be resolved thereby forming a clathrate of the Werner complex $Ni(CNS)_2X_4$ with said aromatic compound, recovering by heating the selectively absorbed aromatic compound with simultaneous dissociation of the complex $Ni(CNS)_2X_4$ into the corresponding complex $$Ni(CNS)_2X_2$$

and 2 free moles of the amine X, said 2 moles accompanying the liberated aromatic compound, and recovering said amine from said aromatic compound, this recovered amine and the complex $Ni(CNS)_2X_2$ obtained by the hereabove dissociation being thus available for a further clathration step.

4. A process following claim 3 wherein X is selected from the group consisting of:

Alpha-phenylethylamine
Alpha-phenylpropylamine
Alpha-phenylbutylamine
Alpha-phenylamylamine
Alpha-phenylisoamylamine
Alpha-phenylhexylamine
Alpha-phenylisohexylamine
Alpha-phenylheptylamine
Alpha-(m-tolyl)ethylamine
Alpha-(p-tolyl)ethylamine
Alpha-(p-ethylphenyl)ethylamine
Alpha-(p-tolyl)butylamine
Alpha-(p-tolyl)heptylamine
Alpha-(p-fluorophenyl)ethylamine
Alpha-(o-chlorophenyl)ethylamine
Alpha-(m-chlorophenyl)ethylamine
Alpha-(p-chlorophenyl)ethylamine
Alpha-(m-bromophenyl)ethylamine
Alpha-(p-bromophenyl)ethylamine
Alpha-(p-iodophenyl)ethylamine
Alpha-(p-chlorophenyl)propylamine
Alpha-(m-bromophenyl)propylamine
Alpha-(p-bromophenyl)propylamine
Alpha-(p-bromophenyl)butylamine
Alpha-(p-chlorophenyl)amylamine Alpha-(p-bromophenyl)amylamine
Alpha-(p-fluorophenyl)isoamylamine
Alpha-(p-chlorophenyl)isoamylamine
Alpha-(p-bromophenyl)isoamylamine
Alpha-(p-chlorophenyl)hexylamine
Alpha-(p-bromophenyl)hexylamine
Alpha-(m-bromophenyl)heptylamine
Alpha-(p-bromophenyl)heptylamine
Alpha-(p-methoxyphenyl)ethylamine
Alpha-(p-butoxyphenyl)ethylamine
Alpha-(m-nitrophenyl)ethylamine
Alpha-(3,4-dimethylphenyl)ethylamine
Alpha-(3,4-dimethylphenyl)butylamine
Alpha-(3,4-dimethylphenyl)heptylamine
Alpha-(3,5-dimethylphenyl)ethylamine
Alpha-(3,4,5-trimethylphenyl)ethylamine
Alpha-(3,4,5-triethylphenyl)ethylamine
Alpha-(3,4,5-trimethylphenyl)propylamine
Alpha-(3,4-dichlorophenyl)ethylamine
Alpha-(3,4-dibromophenyl)ethylamine
Alpha-(3,4-dichlorophenyl)butylamine
Alpha-(3,4-dichlorophenyl)heptylamine

References Cited by the Examiner

UNITED STATES PATENTS

| | | | |
|---|---|---|---|
| 2,769,851 | 11/56 | Schaeffer | 260—674 |
| 2,798,891 | 7/57 | Schaeffer | 260—439 |
| 2,827,463 | 3/58 | Schaeffer | 260—674 |

OTHER REFERENCES

Sidgwick: Chemical Elements and Their Compounds, vol. II, page 1400 (1950).

Rey-Bellet et al.: Helvetica Chimica Acta, vol. 39, No. 5–8, page 2107 (1956).

TOBIAS E. LEVOW, *Primary Examiner.*